(12) United States Patent     (10) Patent No.: US 12,658,525 B2

Wu et al.     (45) Date of Patent: Jun. 16, 2026

(54) BATTERY CELL, BATTERY, AND ELECTRICAL APPARATUS

(71) Applicant: CONTEMPORARY AMPEREX TECHNOLOGY CO., LIMITED, Ningde (CN)

(72) Inventors: Kai Wu, Ningde (CN); Wenlin Zhou, Ningde (CN); Liangfan Xu, Ningde (CN); Jian Zhou, Ningde (CN); Quankun Li, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/296,899

(22) Filed: Aug. 11, 2025

(65) Prior Publication Data

US 2025/0364676 A1    Nov. 27, 2025

Related U.S. Application Data

(63) Continuation of application No. PCT/CN2023/116772, filed on Sep. 4, 2023.

(30) Foreign Application Priority Data

May 26, 2023   (CN) .......................... 202310604583.8

(51) Int. Cl.
*H01M 50/342*     (2021.01)
*H01M 50/103*     (2021.01)
(Continued)

(52) U.S. Cl.
CPC ..... *H01M 50/3425* (2021.01); *H01M 50/103* (2021.01); *H01M 50/14* (2021.01);
(Continued)

(58) Field of Classification Search
CPC .... H01M 50/14; H01M 50/15; H01M 50/103; H01M 50/3425
See application file for complete search history.

(56) References Cited

U.S. PATENT DOCUMENTS

2020/0212379 A1 *   7/2020   Shi ..................... H01M 10/0472
2022/0336913 A1 *   10/2022   Gu ....................... H01M 50/375
(Continued)

FOREIGN PATENT DOCUMENTS

CN      205609636 U   *   9/2016
CN      207818654 U    9/2018
(Continued)

OTHER PUBLICATIONS

CN20560936U English machine translation (Year: 2025).*
(Continued)

*Primary Examiner* — Armindo Carvalho, Jr.
(74) *Attorney, Agent, or Firm* — K&L Gates LLP

(57) ABSTRACT

The present application relates to the field of battery technologies and provides a battery cell, a battery, and an electrical apparatus. The battery cell includes a shell, a pressure relief component, and a reinforcement member. The shell comprises a wall portion that is formed with a pressure relief hole. The pressure relief component is disposed within the pressure relief hole and covers the hole. The reinforcement member is also disposed within the pressure relief hole, and its thickness does not exceed that of the wall portion. The reinforcement member is connected to an inner surface of the pressure relief hole and, together with the pressure relief component, is arranged along the thickness direction of the wall portion to reinforce the structural strength of the shell at the pressure relief location.

19 Claims, 7 Drawing Sheets

(51) Int. Cl.
  H01M 50/14 (2021.01)
  H01M 50/15 (2021.01)
(52) U.S. Cl.
  CPC ........ H01M 50/15 (2021.01); H01M 2200/20 (2013.01); H01M 2220/20 (2013.01)

(56) References Cited

U.S. PATENT DOCUMENTS

| | | | | |
|---|---|---|---|---|
| 2022/0367996 A1* | 11/2022 | Chen | .................. | H01M 50/308 |
| 2023/0261312 A1* | 8/2023 | Zhou | .................. | H01M 50/367 |
| | | | | 429/53 |

FOREIGN PATENT DOCUMENTS

| | | | | | |
|---|---|---|---|---|---|
| CN | 112713345 | A | | 4/2021 | |
| CN | 215988965 | U | | 3/2022 | |
| CN | 215988966 | U | * | 3/2022 | .......... H01M 50/164 |
| CN | 215989094 | U | * | 3/2022 | |
| CN | 216980797 | U | | 7/2022 | |
| CN | 217788574 | U | | 11/2022 | |
| CN | 217788585 | U | | 11/2022 | |
| CN | 217788606 | U | | 11/2022 | |
| CN | 217848214 | U | | 11/2022 | |
| CN | 218414926 | U | | 1/2023 | |
| CN | 218867325 | U | | 4/2023 | |
| CN | 116345057 | A | | 6/2023 | |
| EP | 3772762 | A1 | | 2/2021 | |
| WO | WO-2019165648 | A1 | * | 9/2019 | .......... H01M 50/147 |
| WO | WO-2022047788 | A1 | * | 3/2022 | .......... H01M 50/655 |
| WO | 2023050631 | A1 | | 4/2023 | |
| WO | 2023050835 | A1 | | 4/2023 | |
| WO | 2023060537 | A1 | | 4/2023 | |
| WO | 2023077268 | A1 | | 5/2023 | |
| WO | WO-2023159840 | A1 | * | 8/2023 | .......... H01M 50/103 |

OTHER PUBLICATIONS

CN215989094U English machine translation (Year: 2025).*
WO2019165648A1 English machine translation (Year: 2025).*
WO2023159840A1 English machine translation (Year: 2025).*
The International Search Report received in the counterpart International Application No. PCT/CN2023/116772, dated Nov. 9, 2023, 8 pages with English translation.
The ISA Written Opinion received in the counterpart International Application No. PCT/CN2023/116772, dated Nov. 9, 2023, 8 pages with English translation.
The First Office Action received in the counterpart CN Application No. 202310604583.8, dated Jun. 30, 2023, 29 pages with English translation.
The Grant Notice received in the counterpart CN Application No. 202310604583.8, dated Jul. 24, 2023, 8 pages with English translation.

* cited by examiner

BATTERY CELL, BATTERY, AND ELECTRICAL APPARATUS

CROSS-REFERENCE TO RELATED APPLICATIONS

The present application is a continuation of International Application No. PCT/CN2023/116772, filed on Sep. 4, 2023, which claims the priority of Chinese Patent Application No. 2023106045838 filed on May 26, 2023 and entitled "BATTERY CELL, BATTERY, AND ELECTRICAL APPARATUS," which is incorporated herein by reference in its entirety.

TECHNICAL FIELD

The present application relates to the field of battery technologies, and in particular, to a battery cell, a battery, and an electrical apparatus.

BACKGROUND

In recent years, new energy vehicles have made a leap forward in development. In the field of electric vehicles, power batteries, as power sources of electric vehicles, play an irreplaceable and important role. With the vigorous promotion of new energy vehicles, the demand for power battery products is also growing. Batteries, as core components of new energy vehicles, have high requirements in terms of reliability and service life.

In battery technologies, in order to ensure the safety of battery cells, a pressure relief component for relieving an internal pressure of a battery cell is generally arranged on a shell of the battery cell, so that when the internal pressure or temperature of the battery cell reaches a threshold, the pressure relief component is capable of being actuated to release the internal pressure of the battery cell. However, the pressure relief component of the existing battery cell often releases pressure prematurely during use, resulting in poor stability in use of the battery cell, which is not conducive to improving the service life and reliability of the battery cell.

SUMMARY OF THE INVENTION

Embodiments of the present application provide a battery cell, a battery, and an electrical apparatus, which are capable of effectively improving the reliability of the battery cell.

In a first aspect, an embodiment of the present application provides a battery cell, including a shell, a pressure relief component, and a reinforcement member; the shell has a wall portion, and the wall portion is formed with a pressure relief hole; the pressure relief component is arranged in the pressure relief hole and covers the pressure relief hole, and the pressure relief component is configured to release an internal pressure of the battery cell; the reinforcement member is arranged in the pressure relief hole and does not exceed the pressure relief hole in a thickness direction of the wall portion, the reinforcement member is connected to a hole wall surface of the pressure relief hole, and the reinforcement member and the pressure relief component are arranged in the thickness direction of the wall portion to reinforce the strength of the wall portion at the pressure relief hole.

In the above-mentioned technical solution, the reinforcement member is arranged on the wall portion of the shell, and the pressure relief component and the reinforcement member are both arranged in the pressure relief hole of the wall portion. By connecting the reinforcement member to the hole wall surface of the pressure relief hole, and arranging the reinforcement member and the pressure relief component in the thickness direction of the wall portion, the reinforcement member becomes a structure located on one side of the pressure relief component arranged in the pressure relief hole in the thickness direction of the wall portion, so that the reinforcement member is capable of improving the structural strength of a region of the wall portion where the pressure relief hole is arranged, and is capable of effectively alleviating the phenomenon that the pressure relief hole deforms when the wall portion is subjected to internal and external impact forces, thereby being capable of playing a certain protective role for the pressure relief component, so as to reduce the impact to the pressure relief component when the wall portion is subjected to the internal and external impact forces, which is conducive to alleviating the deformation of or damage to the pressure relief component, and is further capable of effectively reducing the situation of premature actuation for pressure relief during use of the pressure relief component, thereby improving the use stability and service life of the pressure relief component, and being conducive to improving the service life and reliability of the battery cell. In addition, by arranging the reinforcement member in the pressure relief hole and connecting the reinforcement member to the hole wall surface of the pressure relief hole, on the one hand, the supporting effect of the reinforcement member on the hole wall surface of the pressure relief hole is capable of being improved, so as to enhance the protective effect of the reinforcement member on the pressure relief component, which is conducive to further reducing the impact on the pressure relief component caused by the deformation of the pressure relief hole when the wall portion is subjected to the internal and external impact forces. On the other hand, the space occupied by the wall portion and the reinforcement member in the thickness direction of the wall portion are capable of being saved, which is conducive to improving the space utilization of the battery cell.

In some embodiments, the reinforcement member includes a first reinforcement portion; both ends of the first reinforcement portion in an extension direction thereof are connected to the hole wall surface of the pressure relief hole.

In the above-mentioned technical solution, the reinforcement member is provided with the first reinforcement portion, and by connecting both ends of the first reinforcement portion in the extension direction thereof to the hole wall surface of the pressure relief hole, the first reinforcement portion is capable of supporting the pressure relief hole in the extension direction of the first reinforcement portion, so that when the wall portion is subjected to the internal and external impact forces, the risk of deformation of the pressure relief hole in the extension direction of the first reinforcement portion is capable of being reduced, thereby reducing the deformation of or damage to the pressure relief component in the extension direction of the first reinforcement portion.

In some embodiments, the reinforcement member further includes a second reinforcement portion; the second reinforcement portion intersects with the first reinforcement portion, and both ends of the second reinforcement portion in an extension direction thereof are connected to the hole wall surface of the pressure relief hole.

In the above-mentioned technical solution, the reinforcement member is further provided with the second reinforcement portion intersecting with the first reinforcement portion, and both ends of the second reinforcement portion in the extension direction thereof are connected to the hole wall surface of the pressure relief hole, so that the reinforcement member is capable of supporting the pressure relief hole in the extension direction of the second reinforcement portion, which is conducive to further enhancing the protective effect of the reinforcement member on the pressure relief component.

In some examples, the first reinforcement portion and the second reinforcement portion are perpendicular to each other.

In the above-mentioned technical solution, by arranging the first reinforcement portion and the second reinforcement portion as structures perpendicular to each other, the reinforcement member is capable of supporting the pressure relief hole in two directions perpendicular to each other, thereby further improving the deformation resistance of the pressure relief hole when subjected to the internal and external impact forces, so as to further reduce the risk of deformation of or damage to the pressure relief component during use.

In some embodiments, there are a plurality of second reinforcement portions, and the plurality of second reinforcement portions are arranged at intervals in the extension direction of the first reinforcement portion.

In the above-mentioned technical solution, by providing the plurality of second reinforcement portions of the reinforcement member, and arranging the plurality of second reinforcement portions at intervals in the extension direction of the first reinforcement portion, the structural strength of the reinforcement member itself is capable of being improved, so as to further enhance the supporting effect of the reinforcement member on the pressure relief hole, and further enhance the protective effect of the reinforcement member on the pressure relief component.

In some embodiments, the pressure relief hole includes a first hole section, the reinforcement member is arranged in the first hole section, the reinforcement member is connected to a hole wall surface of the first hole section, the reinforcement member is configured to partition the first hole section into a plurality of through holes, and the through holes extend in the thickness direction of the wall portion.

In the above-mentioned technical solution, the pressure relief hole has the first hole section, the reinforcement member is arranged in the first hole section of the pressure relief hole, and the first hole section is partitioned into the plurality of through holes extending in the thickness direction of the wall portion, so that the reinforcement member is capable of playing a certain supporting role for the pressure relief hole without affecting the normal pressure relief and exhaust of the pressure relief hole, so as to protect the pressure relief component, which is conducive to alleviating the deformation of or damage to the pressure relief component during use.

In some embodiments, the pressure relief component is provided with a score groove, and the pressure relief component is configured to crack along the score groove during pressure relief of the battery cell, so as to release the internal pressure of the battery cell; where a projection of the score groove in the thickness direction of the wall portion does not overlap with the through hole.

In the above-mentioned technical solution, the pressure relief component is provided with the score groove, so that a weak region is formed on the pressure relief component, and therefore, the pressure relief component is capable of cracking along the score groove during pressure relief of the battery cell, thereby being capable of relieving the internal pressure of the battery cell. By arranging the score groove of the pressure relief component so that the projection in the thickness direction of the wall portion does not overlap with the through hole, the score groove of the pressure relief component and the through hole are staggered with each other to alleviate the impact of an electrolyte or other external substances inside the battery cell on the score groove of the pressure relief component, thereby being capable of reducing the wear of or damage to the pressure relief component, reducing the situation of premature actuation for pressure relief during use of the pressure relief component, and being conducive to improving the service life and reliability of the battery cell.

In some embodiments, the pressure relief component is provided with the score groove, and the pressure relief component is configured to crack along the score groove during pressure relief of the battery cell, so as to release the internal pressure of the battery cell; where a sum of projection areas of the plurality of through holes in the thickness direction of the wall portion is $S_1$, the projection area of the score groove is $S_2$, and they meet $0.5S_2 \leq S_1 \leq 1.2S_2$.

In the above-mentioned technical solution, the pressure relief component is provided with the score groove, and by setting the sum of the projection areas of the plurality of through holes in the thickness direction of the wall portion to 0.5 times to 1.2 times the projection area of the score groove in the thickness direction of the wall portion, on the one hand, it is capable of alleviating the phenomenon of poor exhaust and low exhaust rate due to an excessively small ratio of the sum of the projection areas of the plurality of through holes to the projection area of the score groove, which is conducive to improving the exhaust effect of the battery cell during pressure relief. On the other hand, it is capable of alleviating the phenomenon of waste of through holes and affecting the structural strength of the reinforcement member due to an excessively large ratio of the sum of the projection areas of the plurality of through holes to the projection area of the score groove.

In some embodiments, the pressure relief hole includes a first hole section and a second hole section arranged in the thickness direction of the wall portion, a projection of the first hole section in the thickness direction of the wall portion is located in the second hole section, and a hole wall surface of the first hole section is connected to a hole wall surface of the second hole section through a first step surface; where the reinforcement member is arranged in the first hole section, the reinforcement member is connected to the hole wall surface of the first hole section, and the pressure relief component covers the second hole section.

In the above-mentioned technical solution, the pressure relief hole is provided with the first hole section and the second hole section arranged in the thickness direction of the wall portion, and the projection of the first hole section in the thickness direction of the wall portion is located in the second hole section, so that the pressure relief hole has a stepped hole structure. On the one hand, it facilitates assembling of the reinforcement member and the pressure relief component, and is conducive to reducing the difficulty of assembling the reinforcement member and the pressure relief component. On the other hand, it is capable of optimizing a material flow pattern in the process of machining the pressure relief hole on the wall portion, which is conducive to reducing the difficulty of machining the pressure relief hole.

In some embodiments, the pressure relief component is provided with the score groove, and the pressure relief component is configured to crack along the score groove during pressure relief of the battery cell, so as to release the internal pressure of the battery cell; where a projection of the score groove in the thickness direction of the wall portion is located in the first step surface.

In the above-mentioned technical solution, by arranging the projection of the score groove of the pressure relief component to be in the first step surface between the first hole section and the second hole section in the thickness direction of the wall portion, the score groove of the pressure relief component is capable of being protected to a certain extent by the first step surface, so as to alleviate the impact of the electrolyte or other external substances inside the battery cell on the score groove of the pressure relief component, thereby being capable of reducing the wear of or damage to the pressure relief component, reducing the situation of premature actuation for pressure relief during use of the pressure relief component, and being conducive to improving the service life and reliability of the battery cell.

In some embodiments, the pressure relief hole further includes a third hole section. In the thickness direction of the wall portion, the third hole section is located on one side of the second hole section away from the first hole section, and the projection of the second hole section is located in the third hole section. The hole wall surface of the second hole section is connected to a hole wall surface of the third hole section through a second step surface, and the pressure relief component is arranged in the third hole section and abuts against the second step surface.

In the above-mentioned technical solution, the pressure relief hole is further provided with the third hole section, and the first hole section, the second hole section, and the third hole section are structures arranged in sequence in the thickness direction of the wall portion, so that the pressure relief hole is a stepped hole structure with at least three hole sections. By arranging the pressure relief component in the third hole section and abutting against the second step surface, on the one hand, it is conducive to assembling the pressure relief component and facilitating the pressure relief component to cover the second hole section; and on the other hand, the second step surface is capable of playing a certain position-limiting role on the pressure relief component, which is conducive to improving the structural stability of the pressure relief component assembled into the pressure relief hole.

In some embodiments, the pressure relief component is provided with the score groove, and the pressure relief component is configured to crack along the score groove during pressure relief of the battery cell, so as to release the internal pressure of the battery cell; where in a radio direction of the second hole section, a distance between the hole wall surface of the second hole section and the score groove is $L_1$, meeting $L_1 \geq 0.5$ mm.

In the above-mentioned technical solution, by setting the distance between the score groove of the pressure relief component and the hole wall surface of the second hole section in the radial direction of the second hole section to be greater than or equal to 0.5 mm, a stress generated by the wall portion acting on the region of the pressure relief component where the score groove is provided is capable of being reduced, thereby alleviating the damage to or rupture of the region of the pressure relief component where the score groove is arranged, and further reducing the risk of premature actuation for pressure relief of the pressure relief component, thereby improving the service life and reliability of the battery cell.

In some embodiments, the pressure relief component and the reinforcement member are gap-arranged in the thickness direction of the wall portion.

In the above-mentioned technical solution, the pressure relief component and the reinforcement member are arranged as a gap-arranged structure in the thickness direction of the wall portion, that is, there is a gap between the pressure relief component and the reinforcement member in the thickness direction of the wall portion, so that the pressure relief component and the reinforcement member are arranged at an interval in the thickness direction of the wall portion, thereby being capable of alleviating the phenomenon that the stress on the reinforcement member in the process of supporting the pressure relief hole affects the pressure relief component, so as to reduce the risk of deformation of or damage to the pressure relief component due to the stress of the reinforcement member, and further effectively alleviate the phenomenon of premature actuation for pressure relief during use of the pressure relief component, which is conducive to improving the service life and reliability of the battery cell.

In some embodiments, in the thickness direction of the wall portion, a distance between the pressure relief component and the reinforcement member is $L_2$, meeting 0.3 mm$\leq L_2 \leq 5$ mm.

In the above-mentioned technical solution, by setting the distance between the pressure relief component and the reinforcement member in the thickness direction of the wall portion to 0.3 mm to 5 mm, on the one hand, it is capable of alleviating the phenomenon that the stress generated by deformation of the reinforcement member is applied to the reinforcement member due to the small distance between the pressure relief component and the reinforcement member, so as to reduce the risk of deformation of or damage to the pressure relief component. On the other hand, it is capable of alleviating the phenomenon that the pressure relief component and the reinforcement member occupy too much space in the thickness direction of the wall portion due to the large distance between the pressure relief component and the reinforcement member, which is thereby conducive to reducing the space waste of the battery cell in the thickness direction of the wall portion, so as to improve the energy density of the battery cell.

In some embodiments, in the thickness direction of the wall portion, the thickness of the reinforcement member is $D_1$, and the thickness of the wall portion is $D_2$, meeting $0.4D_2 \leq D_1 \leq D_2$.

In the above-mentioned technical solution, by setting the thickness of the reinforcement member in the thickness direction of the wall portion to 0.4 times to 1 times the thickness of the wall portion, the phenomenon of insufficient structural strength of the reinforcement member due to the excessively small thickness of the reinforcement member is capable of being alleviated, so as to enhance the supporting effect of the reinforcement member on the pressure relief hole, which is conducive to improving the protective effect of the reinforcement member on the pressure relief component. On the other hand, it is capable of alleviating the phenomenon of waste and excessive space occupation caused by the excessively large thickness of the reinforcement member, which is conducive to reducing the manufacturing cost of the battery cell and improving the energy density of the battery cell.

In some examples, the reinforcement member and the wall portion are integrally formed.

In the above-mentioned technical solution, by arranging the reinforcement member and the wall portion as an integrally formed structure, it is conducive to improving the connection stability and structural strength between the reinforcement member and the wall portion, so as to enhance the supporting effect of the reinforcement member on the pressure relief hole, thereby being conducive to enhancing the protective effect of the reinforcement member for the pressure relief component.

In some embodiments, a recessed groove is formed on one side of the wall portion in the thickness direction of the wall portion, and the pressure relief hole is arranged on a groove bottom wall of the recessed groove; where the pressure relief component is closer to the recessed groove than the reinforcement member.

In the above-mentioned technical solution, a recessed groove is provided on one side of the wall portion in the thickness direction thereof, and the pressure relief hole is a structure that penetrates the groove bottom surface of the recessed groove. By arranging the pressure relief component to be closer to the recessed groove than the reinforcement member, the pressure relief component is a structure that is at least partially located between the reinforcement member and the recessed groove. Therefore, the recessed groove is capable of providing a certain degree of protection for the pressure relief component, thereby reducing the wear of or damage to the pressure relief component caused by the external environment or the internal components of the battery cell, and further being conducive to increasing the service life of the battery cell.

In some embodiments, in the thickness direction of the wall portion, a protrusion is formed on one side of the wall portion away from the recessed groove and at a position corresponding to the recessed groove.

In the above-mentioned technical solution, by forming the protrusion on the side of the wall portion away from the recessed groove and at the position corresponding to the recessed groove, the recessed groove of the wall portion is a concave-convex structure that can be formed by stamping, thereby being capable of forming the recessed groove and the protrusion on two sides of the wall portion, respectively. The wall portion with such a structure is easy to manufacture and is conducive to reducing the difficulty in processing the recessed groove, thereby improving the processing efficiency of the recessed groove.

In some embodiments, in the thickness direction of the wall portion, the pressure relief component has a first side facing the interior of the shell, and the reinforcement member is located on the first side.

In the above-mentioned technical solution, the pressure relief component has the first side facing the interior of the shell in the thickness direction of the wall portion, and the reinforcement member is located on the first side of the pressure relief component, so that the reinforcement member is closer to the interior of the shell than the pressure relief component in the thickness direction of the wall portion. Therefore, the reinforcement member is further capable of playing a certain partitioning role between the pressure relief component and the internal components of the battery cell, so as to alleviate the wear of or damage to the pressure relief component under the impact of the internal components of the battery cell.

In some embodiments, in the thickness direction of the wall portion, the pressure relief component has a second side away from the interior of the shell, and the reinforcement member is located on the second side.

In the above-mentioned technical solution, the pressure relief component has the second side away from the interior of the shell in the thickness direction of the wall portion, and the reinforcement member is located on the second side of the pressure relief component, so that the reinforcement member is farther from the interior of the shell than the pressure relief component in the thickness direction of the wall portion. Therefore, the reinforcement member is further capable of playing a certain partitioning role between the pressure relief component and the external environment, so as to alleviate the wear of or damage to the pressure relief component under the impact of the external environment.

In some embodiments, the shell assembly includes: a case and an end cover; an accommodating cavity having an opening is formed in the interior of the case, and the accommodating cavity is configured to accommodate an electrode assembly; and the end cover closes the opening, where the end cover is the wall portion.

In the above-mentioned technical solution, by setting the wall portion of the shell as the end cover of the shell for closing the opening of the case, the battery cell adopting this structure is conducive to setting the pressure relief hole on the end cover, and it is convenient to arrange the pressure relief component and the reinforcement member on the end cover, which is capable of effectively reducing the processing difficulty of arranging the pressure relief component and the reinforcement member on the shell of the battery cell, so as to improve the production efficiency of the battery cell.

In some embodiments, the shell includes the case and the end cover; the case has a side wall and the wall portion that are integrally formed, the side wall encloses the periphery of the wall portion, and in the thickness direction of the wall portion, one end of the side wall is connected to the wall portion, the other end encloses to form an opening, and the side wall and the wall portion together define the accommodating cavity for accommodating the electrode assembly; and the end cover closes the opening.

In the above-mentioned technical solution, by arranging the wall portion of the shell as a wall arranged opposite to the end cover in the thickness direction of the wall portion, the battery cell adopting this structure is capable of causing the region of the shell where the pressure relief component is arranged far from the end cover, and causing that there is no direct connection relationship between the wall portion and the end cover, thereby being capable of alleviating the influence of the stress generated during interconnection of the end cover and the case on the pressure relief component, so as to reduce the phenomenon of cracking or reduction in structural strength of the pressure relief component, and further be capable of effectively reducing the situation of premature actuation of the valve for pressure relief of the battery cell, so as to improve the stability and service life of the battery cell.

In a second aspect, an embodiment of the present application further provides a battery, including the above-mentioned battery cell.

In a third aspect, an embodiment of the present application further provides an electrical apparatus, including the above-mentioned battery cell, the battery cell being configured to provide electric energy.

DESCRIPTION OF THE DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
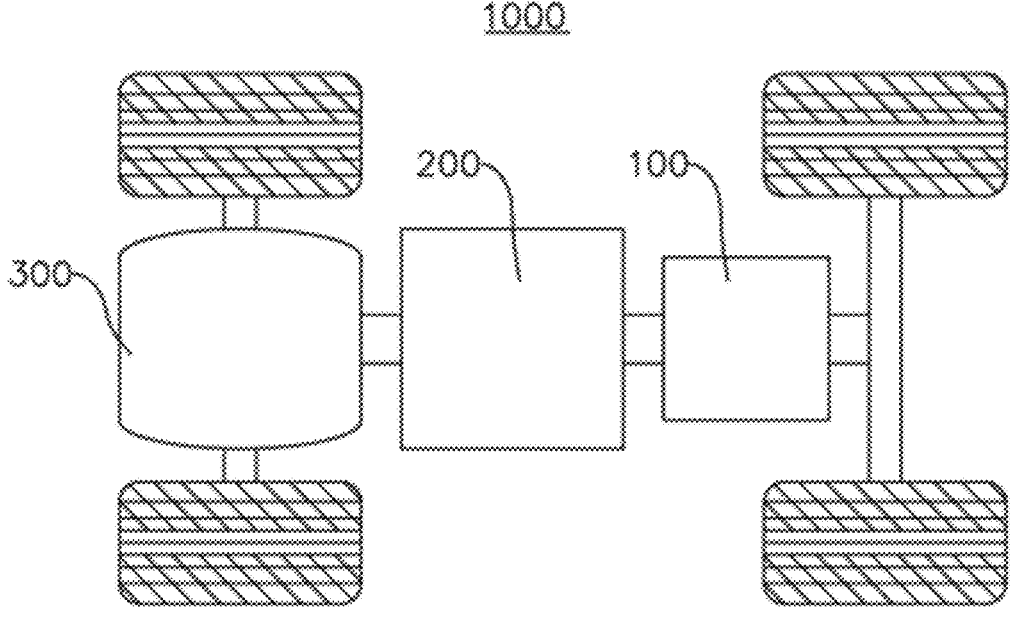
FIG. 1 is a schematic structural diagram of a vehicle according to some embodiments of the present application.

Reference numerals: 1000—Vehicle; 100—Battery; 10—Box; 11—First box body; 12—Second box body; 20—Battery cell; 21—Shell; 211—Wall portion; 2111—Recessed groove; 2112—Protrusion; 2113—Protruding portion; 212—Pressure relief hole; 2121—First hole section; 2121*a*—Through hole; 2122—Second hole section; 2123—Third hole section; 2124—First step surface; 2125—Second step surface; 213—Case; 2131—Opening; 214—End cover; 22—Pressure relief component; 221—Score groove; 23—Reinforcement member; 231—First reinforcement portion; 232—Second reinforcement portion; 24—Electrode assembly; 241—Tab; 25—Electrode terminal; 200—Controller; 300—Motor; X—Thickness direction of the wall portion.

DETAILED DESCRIPTION

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application shall have the same meanings as those generally understood by those skilled in the art of the present application. The terms used in the present application in the specification of application are merely for the purpose of describing specific embodiments and are not intended to limit the present application. The terms "include" and "have" and any variations thereof in the specification and claims and the above brief description of the drawings of the present application are intended to cover non-exclusive inclusion. The terms "first," "second," etc. in the specification and the claims of the present application as well as the above drawings are used to distinguish different objects, rather than to describe a specific order or primary-secondary relationship.

The phrase "embodiment" referred to in the present application means that the descriptions of specific features, structures, and characteristics in combination with the embodiment are included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting," "connecting," "connection" and "attachment" should be understood in a broad sense, unless otherwise explicitly specified or defined, for example, it may be a fixed connection, a detachable connection or an integrated connection; and may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relation describing associated objects, which means that there may be three relations, for example, A and/or B may represent three situations: A exists alone, both A and B exist, and B exists alone. In addition, the character "/" in the present application generally means that the associated objects before and after it are in an "or" relationship.

In the embodiments of the present application, the same reference signs denote the same components, and for the sake of brevity, detailed descriptions of the same components are omitted in different embodiments. It should be understood that the thickness, length, width and other dimensions of the various components in the embodiments of the present application shown in the drawings, as well as the overall thickness, length, width and other dimensions of an integrated apparatus, are for illustrative purposes only, and should not constitute any limitation to the present application.

In the present application, the "plurality of" refers to more than two (including two).

In the embodiments of the present application, a battery cell may be a secondary battery. The secondary battery refers to a battery cell that, after being discharged, can activate an active material by charging for continued use.

The battery cell may be a lithium-ion battery, a sodium-ion battery, a sodium/lithium-ion battery, a lithium metal battery, a sodium metal battery, a lithium sulfur battery, a magnesium-ion battery, a nickel hydrogen battery, a nickel cadmium battery, a lead storage battery, and the like. The embodiments of the present application are not limited to this.

The battery cell generally includes an electrode assembly. The electrode assembly includes a positive electrode, a negative electrode and a spacer. During charging and discharging of the battery cell, active ions (such as lithium ions) are intercalated and deintercalated back and forth between the positive electrode and the negative electrode. The spacer is arranged between the positive electrode and the negative electrode, and can function to prevent short circuit between the positive electrode and the negative electrode and allow the active ions to pass through.

In some embodiments, the positive electrode may be a positive electrode plate, and the positive electrode plate may include a positive electrode current collector and a positive electrode active material arranged on at least one surface of the positive electrode current collector.

As an example, the positive electrode current collector has two surfaces opposite in its own thickness direction, and the positive electrode active material is arranged on either one or both of the two opposite surfaces of the positive electrode current collector.

As an example, a metal foil or a composite current collector may be used as the positive electrode current collector. For example, silver surface-treated aluminum or stainless steel, stainless steel, copper, aluminum, nickel, carbon electrode, carbon, nickel, titanium, or the like may be used as the metal foil. The composite current collector may include a polymer material substrate layer and a metal layer. The composite current collector may be formed by forming a metal material (such as aluminum, aluminum alloy, nickel, nickel alloy, titanium, titanium alloy, silver, and silver alloy) on a high molecular material substrate (such as a substrate of polypropylene, polyethylene terephthalate, polybutylene terephthalate, polystyrene, or As an example, the positive electrode active material may include at least one of the following materials: a lithium-containing phosphate, a lithium transition metal oxide, and a respective modified compound thereof. However, the present application is not limited to these materials, and other conventional materials useful as positive electrode active materials for batteries can also be used. These positive electrode active materials may be used alone or in combination of two or more thereof. Examples of the lithium-containing phosphate may include, but are not limited to, at least one of lithium iron phosphate (e.g., LiFePO4 (LFP)), lithium iron phosphate-carbon composite, lithium manganese phosphate (e.g., LiMnPO4), lithium manganese phosphate-carbon composite, lithium iron manganese phosphate, and lithium iron manganese phosphate-carbon composite.

In some embodiments, the negative electrode may be a negative electrode plate, and the negative electrode plate may include a negative electrode current collector.

For example, a metal foil, a foam metal, or a composite current collector may be used as the negative electrode current collector. For example, as the metal foil, silver surface-treated aluminum or stainless steel, stainless steel, copper, aluminum, nickel, baked carbon, carbon, nickel, titanium, or the like can be used. The foam metal may be foam nickel, foam copper, foam aluminum, foam alloy, or foam carbon, etc. The composite current collector may include a polymer material substrate layer and a metal layer. The composite current collector may be formed by forming a metal material (such as copper, copper alloy, nickel, nickel alloy, titanium, titanium alloy, silver, and silver alloy) on a polymer material substrate (such as a substrate of polypropylene, polyethylene terephthalate, polybutylene terephthalate, polystyrene, or For example, each negative electrode plate may include a negative electrode current collector and a negative active material arranged on at least one surface of the negative electrode current collector.

For example, the negative electrode current collector has two surfaces opposite to each other in its own thickness direction, and the negative active material is arranged on either one or both of the two opposite surfaces of the negative electrode current collector.

For example, the negative active material for the battery cell that is commonly known in this field can be used as the negative active material. For example, the negative active material may include at least one of the following materials:

artificial graphite, natural graphite, soft carbon, hard carbon, a silicon-based material, a tin-based material, lithium titanate, and the like.

In some embodiments, the material of the positive electrode current collector may be aluminum, and the material of the negative electrode current collector may be copper.

In some implementations, the electrode assembly further includes a spacer, and the spacer is arranged between the positive electrode and the negative electrode.

In some implementations, the spacer is a separator. There may be various types of separators, and any well-known separator with a porous structure having good chemical stability and mechanical stability may be selected.

As an example, the main material of the separator may be selected from at least one of glass fiber, non-woven fabric, polyethylene, polypropylene, polyvinylidene fluoride, and ceramic.

In some implementations, the spacer is a solid electrolyte. The solid electrolyte is arranged between the positive electrode and the negative electrode and plays a role of transmitting ions and isolates the positive electrode from the negative electrode.

In some implementations, the battery cell further includes an electrolyte. The electrolyte plays a role of conducting ions between the positive electrode and the negative electrode. The electrolyte may be in a liquid state, a gel state, or a solid state.

In some implementations, the electrode assembly is of a wound structure. The positive electrode plate and the negative electrode plate are wound into the wound structure.

In some implementations, the electrode assembly is of a laminated structure.

In some implementations, the shape of the electrode assembly may be a cylinder, a flat shape, a polygon prism, or the like.

In some implementations, the electrode assembly is provided with a tab. The tab may conduct current out from the electrode assembly. The tab includes a positive tab and a negative tab.

In some implementations, the battery cell may include a shell. The shell is configured to encapsulate components such as the electrode assembly and the electrolyte. The shell may be a steel shell, an aluminum shell, a plastic shell (such as polypropylene), a composite metal shell (such as a copper-aluminum composite shell), an aluminum-plastic film, or the like.

As an example, the battery cell may be a cylindrical battery cell, a prismatic battery cell, or a battery cell in another shape. The prismatic battery cell includes, but is not limited to, a square-shell battery cell, a blade-shaped battery cell, and a multi-prism battery. For example, the multi-prism battery may be a hexagonal prism battery, and the like.

A battery mentioned in the embodiments of the present application is a single physical module including one or a plurality of battery cells to provide a higher voltage and capacity.

In some embodiments, the battery may be a battery module. When there are a plurality of battery cells, the plurality of battery cells are arranged and fixed to form a battery module.

In some embodiments, the battery may be a battery pack. The battery pack includes a box body and a battery cell. The battery cell or the battery module is accommodated in the box body.

In some embodiments, the box body may be a part of a vehicle chassis structure. For example, a part of the box body may become at least a part of a vehicle floor, or a part of the box body may become at least a part of a cross beam and a longitudinal beam of a vehicle.

In some embodiments, the battery may be an energy storage apparatus.

The energy storage apparatus includes an energy storage container, an energy storage cabinet, or the like.

The battery has outstanding advantages such as high energy density, low environmental pollution, high power density, long service life, wide adaptability, and low self-discharge coefficient, thus being an important component of today's new energy development. With the rapid development and increasing demand for batteries, requirements for service life and reliability in use of the batteries are also increasing.

In the battery technologies, for a common battery cell, in order to ensure the safety in use of the battery cell, a pressure relief component may be arranged on a shell of the battery cell, so as to release an internal pressure of the battery cell through the pressure relief component, thereby being capable of effectively improving the safety in use of the battery cell. In the related art, a pressure relief hole connecting the interior and the exterior of a shell is usually provided on the shell, and a pressure relief component is arranged in the pressure relief hole and blocks the pressure relief hole, so that when an internal pressure or temperature of the battery cell reaches a threshold, the pressure relief component is capable of being actuated and opened to release the internal pressure of the battery cell. However, during use, when the battery cell is subjected to internal and external impact forces, the shell may be subject to deformation, for example, creep deformation, which quite easily cause the shape of the pressure relief hole provided on the shell to change, thereby affecting the pressure relief component arranged in the pressure relief hole, so that it is very easy for the pressure relief component to be deformed or damaged, thereby resulting in poor stability in use of the pressure relief component, and easily causing the pressure relief component to be prematurely actuated to release pressure during use, which is not conducive to improving the service life and reliability of the battery cell.

Based on the above-mentioned considerations, in order to solve the problems of short service life and low reliability of battery cells, an embodiment of the present application provides a battery cell, and the battery cell includes a shell, a pressure relief component, and a reinforcement member. The shell has a wall portion, and the wall portion is provided with a pressure relief hole. The pressure relief component is arranged in the pressure relief hole and covers the pressure relief hole, and the pressure relief component is configured to release the internal pressure of the battery cell. The reinforcement member is arranged in the pressure relief hole and does not exceed the pressure relief hole in a thickness direction of the wall portion. The reinforcement member is connected to a hole wall surface of the pressure relief hole. The reinforcement member and the pressure relief component are arranged in the thickness direction of the wall portion to reinforce the strength of the wall portion at the pressure relief hole.

In the battery cell of this structure, the reinforcement member is arranged on the wall portion of the shell, and the pressure relief component and the reinforcement member are both arranged in the pressure relief hole of the wall portion. By connecting the reinforcement member to the hole wall surface of the pressure relief hole, and arranging the reinforcement member and the pressure relief component in the thickness direction of the wall portion, the reinforcement member becomes a structure located on one side of the pressure relief component arranged in the pressure relief hole in the thickness direction of the wall portion, so that the reinforcement member is capable of improving the structural strength of a region of the wall portion where the pressure relief hole is arranged, and is capable of effectively alleviating the phenomenon that the pressure relief hole deforms when the wall portion is subjected to internal and external impact forces, thereby being capable of playing a certain protective role for the pressure relief component, so as to reduce the impact to the pressure relief component when the wall portion is subjected to the internal and external impact forces, which is conducive to alleviating the deformation of or damage to the pressure relief component, and is further capable of effectively reducing the situation of premature actuation for pressure relief during use of the pressure relief component, thereby improving the use stability and service life of the pressure relief component, and being conducive to improving the service life and reliability of the battery cell. In addition, by arranging the reinforcement member in the pressure relief hole and connecting the reinforcement member to the hole wall surface of the pressure relief hole, on the one hand, the supporting effect of the reinforcement member on the hole wall surface of the pressure relief hole is capable of being improved, so as to enhance the protective effect of the reinforcement member on the pressure relief component, which is conducive to further reducing the impact on the pressure relief component caused by the deformation of the pressure relief hole when the wall portion is subjected to the internal and external impact forces. On the other hand, the space occupied by the wall portion and the reinforcement member in the thickness direction of the wall portion are capable of being saved, which is conducive to improving the space utilization of the battery cell.

The battery cell disclosed in embodiment of the present application may be used in, but is not limited to, an electrical apparatus such as a vehicle, a ship, or an aircraft. A power source system of the electrical apparatus may be formed by the battery cell disclosed in the present application, a battery, and the like, which is conducive to alleviating the premature actuation of the valve for pressure relief during use of the battery cell, so as to improve the service life and the reliability in use of the battery cell.

An embodiment of the present application provides an electrical apparatus using a battery as a power source. The electrical apparatus may be, but is not limited to, a mobile phone, a tablet, a laptop, an electric toy, an electric tool, a battery vehicle, an electric vehicle, a ship, a spacecraft, and the like. The electric toy may include fixed or mobile electric toys, such as game consoles, electric vehicle toys, electric ship toys, and electric airplane toys. The spacecraft may include airplanes, rockets, space shuttles, spaceships, etc.

For the convenience of description in the following embodiments, an electrical apparatus being a vehicle 1000 according to an embodiment of the present application is taken as an example for the description.

Referring to FIG. 1, FIG. 1 is a schematic structural diagram of a vehicle 1000 according to some embodiments of the present application. The vehicle 1000 may be a fuel vehicle, a gas vehicle or a new energy vehicle. The new energy vehicle may be an all-electric vehicle, a hybrid vehicle, an extended-range vehicle, or the like. A battery 100 is arranged in the vehicle 1000. The battery 100 may be arranged at the bottom or head portion or tail portion of the vehicle 1000. The battery 100 may be used as a power supply for the vehicle 1000, for example, the battery 100 may be used as an operating power source for the vehicle 1000. The vehicle 1000 may further include a controller 200 and a motor 300. The controller 200 is configured to control the battery 100 to supply power to the motor 300, for example, to supply power for starting, navigation and driving of the vehicle 1000.

In some embodiments of the present application, the battery 100 may not only be used as an operating power source for the vehicle 1000, but also as a driving power source for the vehicle 1000, to replace or partially replace fuel or natural gas to provide driving power for the vehicle 1000.

Figure 2:
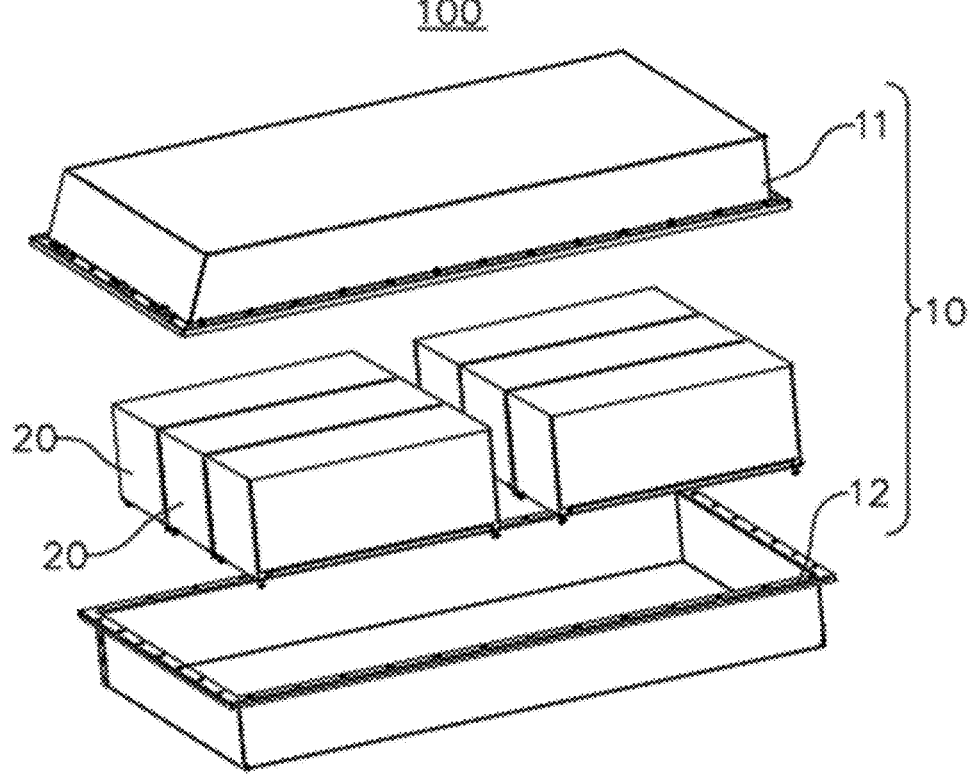
FIG. 2 is an exploded structural diagram of a battery according to some embodiments of the present application.
Figure 3:
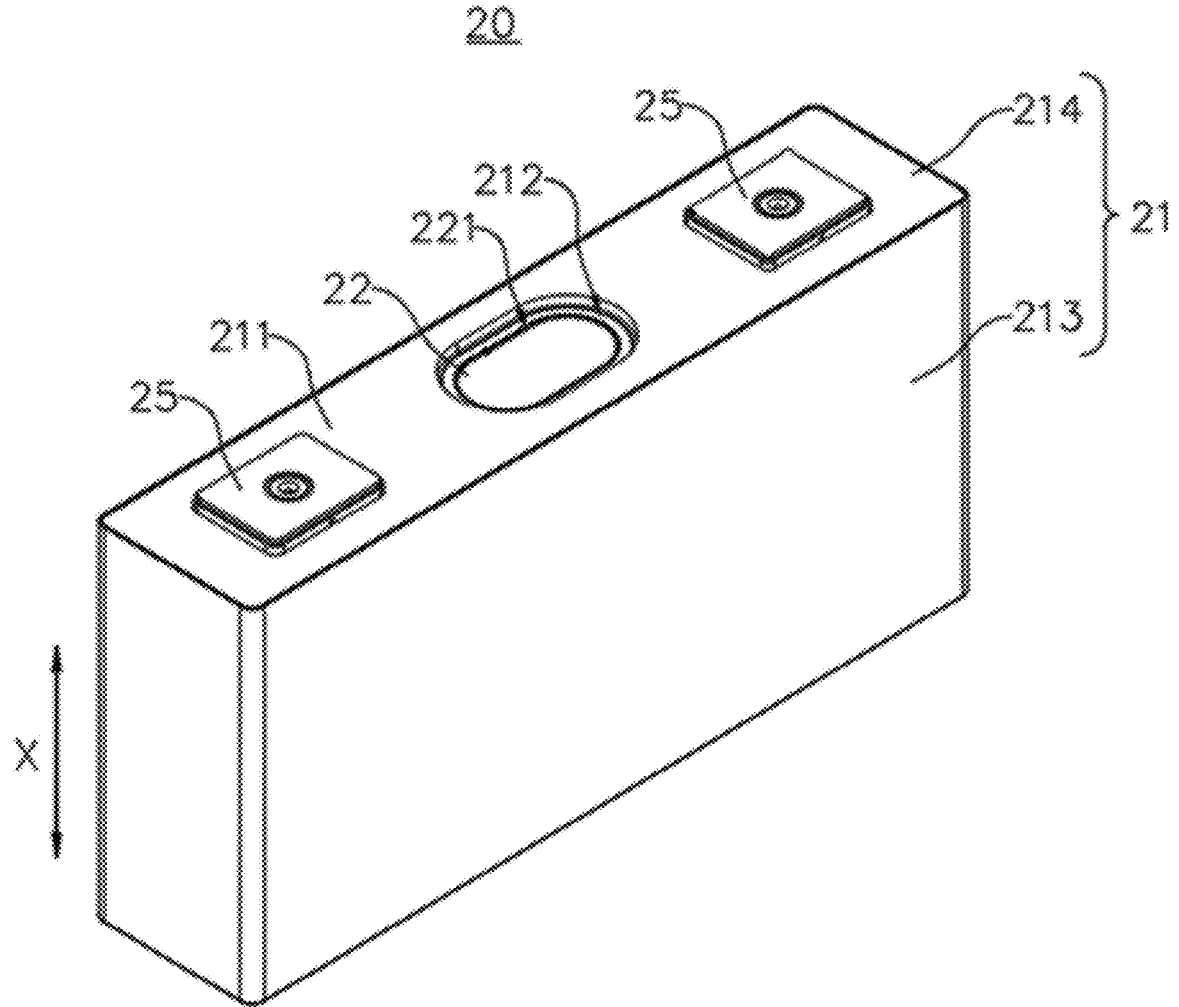
FIG. 3 is a schematic structural diagram of a battery cell according to some embodiments of the present application.

Referring to FIG. 2 and FIG. 3, FIG. 2 is an exploded structural diagram of a battery 100 according to some embodiments of the present application, and FIG. 3 is a schematic structural diagram of a battery cell 20 according to some embodiments of the present application. The battery 100 may include a box 10 and a battery cell 20, and the battery cell 20 is accommodated in the box 10.

The box 10 is used to provide an accommodating space for the battery cell 20, and the box 10 may be of a variety of structures. In some embodiments, the box 10 includes a first box body 11 and a second box body 12. The first box body 11 and the second box body 12 cover each other, and the first box body 11 and the second box body 12 together define an assembling space for accommodating the battery cell 20. The second box body 12 may be of a hollow structure with one end open, the first box body 11 may be of a plate-like structure, and the first box body 11 covers the opening side of the second box body 12, so that the first box body 11 and the second box body 12 together define the assembling space. Both of the first box body 11 and the second box body 12 may also be of a hollow structure with one side open, and the opening side of the first box body 11 covers the opening side of the second box body 12. Of course, the box 10 formed by the first box body 11 and the second box body 12 may be in a variety of shapes, such as a cylinder or a rectangular solid. For example, in FIG. 2, the box body 10 is a cuboid structure.

Optionally, in the battery 100, there may be one or a plurality of battery cells 20 accommodated in the box 10. If there are a plurality of battery cells 20 accommodated in the box 10, the plurality of battery cells 20 may be connected in series, parallel, or parallel-series connection. The parallel-series connection means that the plurality of battery cells 20 are connected in both series and parallel. The plurality of battery cells 20 can be directly connected in series, parallel, or parallel-series connection, and then a whole module formed by the plurality of battery cells 20 is accommodated in the box 10. Definitely, the battery 100 may also be in a form that a plurality of battery cells 20 are connected in series, parallel, or parallel-series connection to form battery modules, and the plurality of battery modules are then connected in series, parallel, or parallel-series connection as an entirety that is accommodated in the box 10.

In some embodiments, the battery 100 may further include other structures. For example, the battery 100 may further include a convergence component, and the plurality of battery cells 20 can be connected through the convergence component so as to realize the electrical connection between the plurality of battery cells 20.

Each battery cell 20 may be a secondary battery or a primary battery; or it may be a lithium-sulfur battery, a sodium-ion battery, or a magnesium-ion battery, but is not limited thereto. The battery cell 20 may be in a cylindrical, flat, or cuboid shape, or in other shapes, or the like. For example, in FIG. 3, the battery cell 20 is a cuboid structure.

Figure 4:
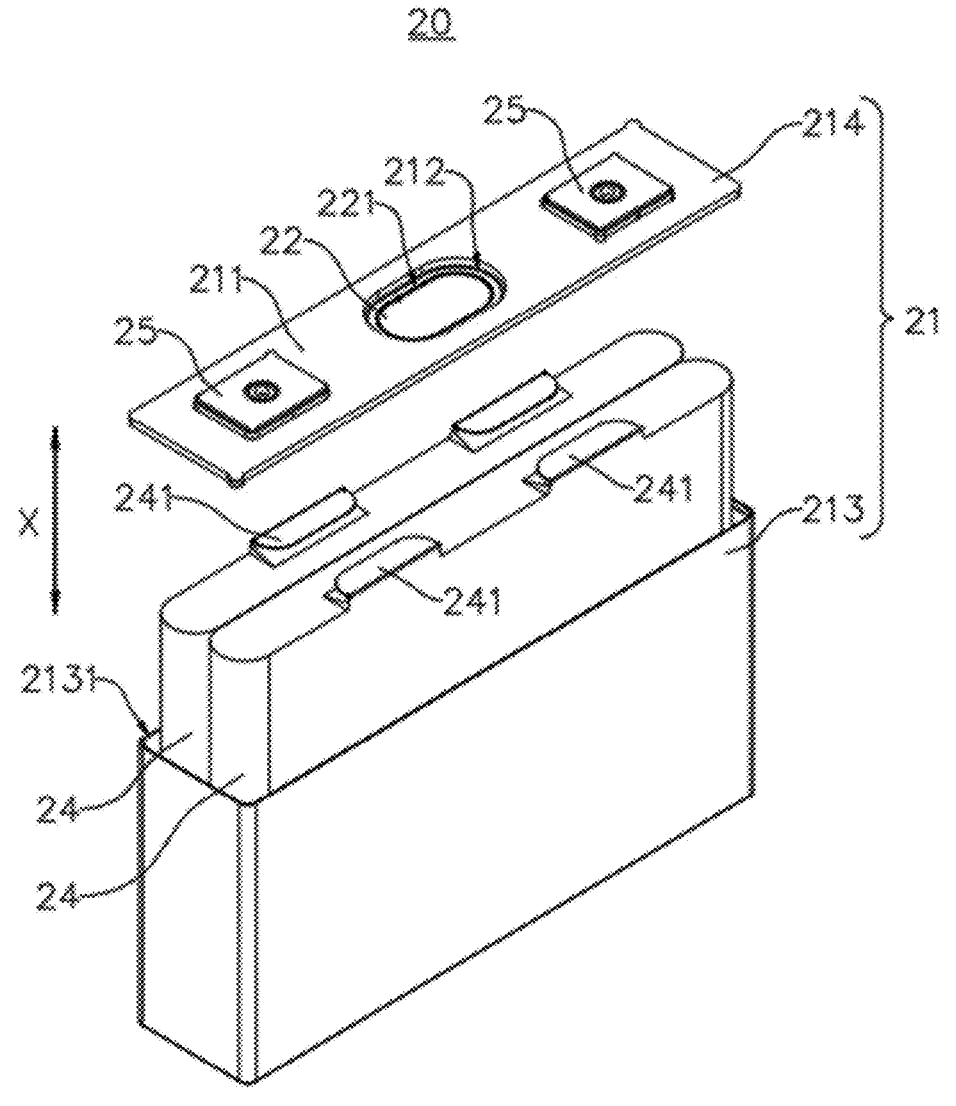
FIG. 4 is an exploded structural diagram of a battery cell according to some embodiments of the present application.
Figure 5:
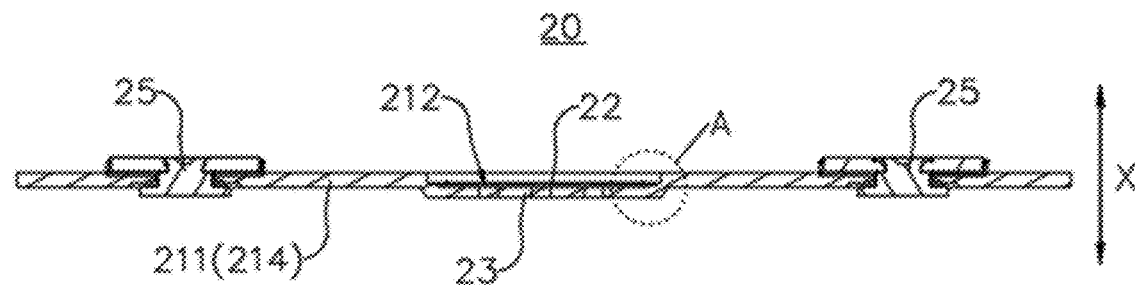
FIG. 5 is a partial sectional diagram of a battery cell according to some embodiments of the present application.
Figure 6:
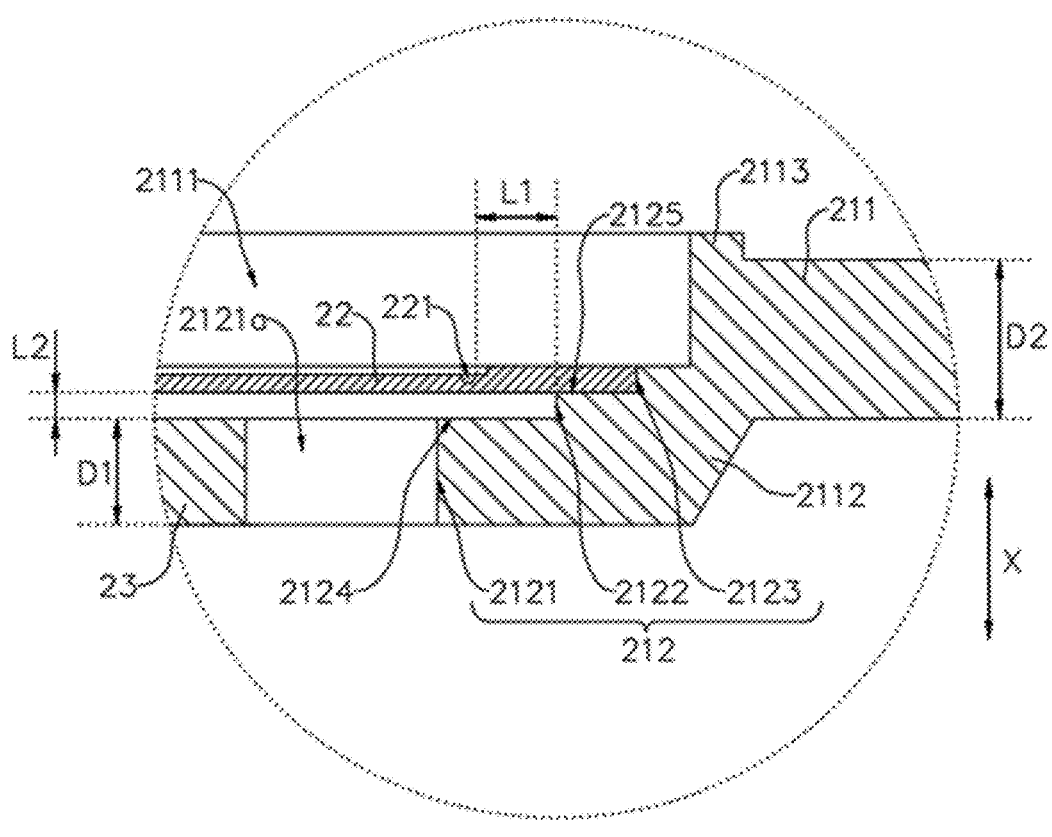
FIG. 6 is a partial enlarged diagram of a portion A of the battery cell shown in FIG. 5.
Figure 7:
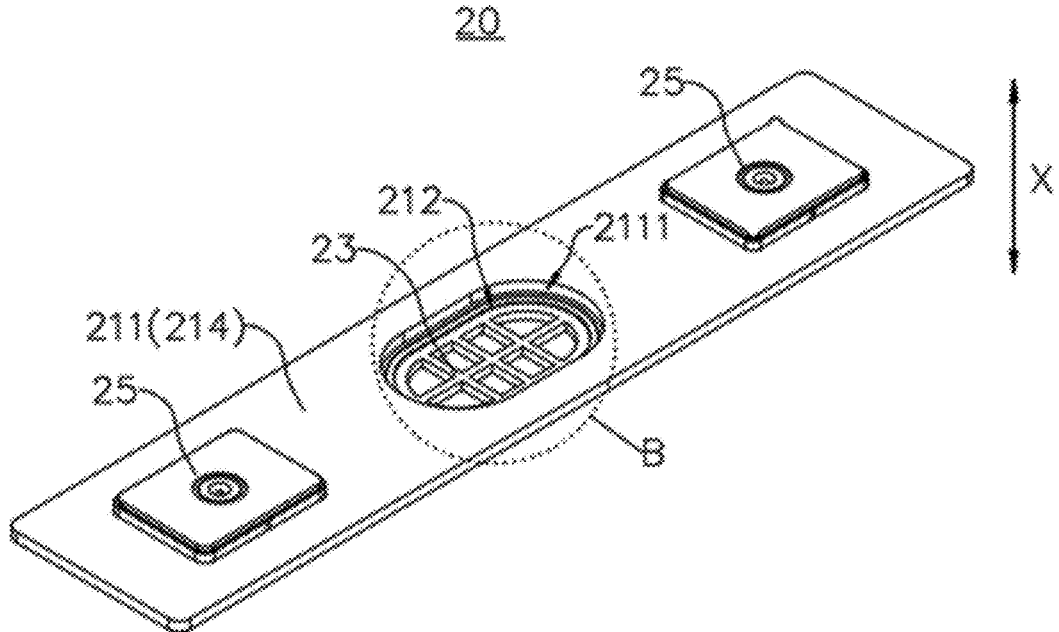
FIG. 7 is a schematic structural diagram of a wall portion of a battery cell according to some embodiments of the present application.

According to some embodiments of the present application, referring to FIG. 3, and further referring to FIG. 4, FIG. 5, FIG. 6, and FIG. 7, where FIG. 4 is an exploded structural diagram of a battery cell 20 according to some embodiments of the present application, FIG. 5 is a partial sectional diagram of a battery cell 20 according to some embodiments of the present application, FIG. 6 is a partial enlarged diagram of a portion A of the battery cell 20 shown in FIG. 5, and FIG. 7 is a schematic partial structural diagram of a battery cell 20 according to some embodiments of the present application. An embodiment of the present application provides a battery cell 20. The battery cell 20 includes a shell 21, a pressure relief component 22, and a reinforcement member 23. The shell 21 has a wall portion 211, and the wall portion 211 is provided with a pressure relief hole 212. The pressure relief component 22 is arranged in the pressure relief hole 212 and covers the pressure relief hole 212, and the pressure relief component 22 is configured to release the internal pressure of the battery cell 20. The reinforcement member 23 is arranged in the pressure relief hole 212 and does not exceed the pressure relief hole 212 in a thickness direction X of the wall portion. The reinforcement member 23 is connected to a hole wall surface of the pressure relief hole 212. The reinforcement member 23 and the pressure relief component 22 are arranged in the thickness direction X of the wall portion to reinforce the strength of the wall portion 211 at the pressure relief hole 212.

The pressure relief component 22 functions to release a pressure, and is configured to release the pressure inside the battery cell 20 when the internal pressure or temperature of the battery cell 20 reaches a predetermined value. The pressure relief component 22 and the wall portion 211 may be of an integrated structure, that is, the pressure relief component 22 is a weak structure formed on the wall portion 211 and used for cracking when the battery cell 20 releases pressure. Of course, the pressure relief component 22 and the wall portion 211 may also be separate structures, and the pressure relief component 22 can be connected to the wall portion 211 by welding or bonding.

In FIG. 6, the pressure relief component 22 and the wall portion 211 are separate structures, and the pressure relief component 22 and the wall portion 211 are connected by welding. For example, the pressure relief component 22 may be an explosion-proof valve, a rupture disc, an air valve, a pressure relief valve, a safety valve, or the like.

In some embodiments, a score groove 221 is provided on the pressure relief component 22 to form a weak structure in a region of the pressure relief component 22 where the score groove 221 is provided. The pressure relief component 22 is configured to be capable of cracking along the score groove 221 during pressure relief of the battery cell 20 to release the internal pressure of the battery cell 20. Optionally, the score groove 221 may have various shapes, such as a strip-shaped groove and an annular groove. For example, in FIG. 3, the score groove 221 is an annular groove.

The reinforcement member 23 is arranged in the pressure relief hole 212 and does not exceed the pressure relief hole 212 in the thickness direction X of the wall portion. The reinforcement member 23 is connected to the hole wall surface of the pressure relief hole 212. In other words, the reinforcement member 23 does not extend out of the pressure relief hole 212 on both sides of the wall portion in the thickness direction X, so that the reinforcement member 23 is entirely accommodated in the pressure relief hole 212, and the reinforcement member 23 is connected to the hole wall surface of the pressure relief hole 212 to realize the connection of the reinforcement member 23 to the wall portion

211. It should be noted that the reinforcement member 23 and the wall portion 211 may be an integral structure, that is, the reinforcement member 23 and the wall portion 211 are manufactured by an integral molding process, such as a stamping process or a casting process. Of course, the pressure relief component 22 and the wall portion 211 may also be separate structures, and the pressure relief component 22 may be connected to the wall portion 211 by welding or bonding.

For example, in FIG. 6 and FIG. 7, the reinforcement member 23 and the wall portion 211 are an integrally formed structure. Of course, in other embodiments, the reinforcement member 23 and the wall portion 211 may also be separate structures, and the reinforcement member 23 is connected to the wall portion 211 by welding or bonding.

The reinforcement member 23 and the pressure relief component 22 are arranged in the thickness direction X of the wall portion, that is, the reinforcement member 23 is arranged on one side of the pressure relief component 22 in the thickness direction X of the wall portion, so that at least part of the projection of the reinforcement member 23 on the thickness direction X of the wall portion is located in the pressure relief hole 212, and therefore, the reinforcement member 23 is capable of supporting the pressure relief component, which is conducive to improving the deformation resistance of the pressure relief hole 212 when the wall portion 211 is subjected to internal or external impacts of the battery cell 20, so as to improve the strength of the wall portion 211 at the pressure relief hole 212.

In some embodiments, referring to FIG. 4, the battery cell 20 may further include an electrode assembly 24, and the electrode assembly 24 is accommodated in the shell 21. The electrode assembly 24 is a component in the battery cell 20 where an electrochemical reaction occurs. The structure of the electrode assembly 24 may be diversified. For example, the electrode assembly 24 may be a wound structure formed by winding a positive electrode plate, a spacer, and a negative electrode plate, or a stacked structure formed by stacking a positive electrode plate, a spacer, and a negative electrode plate.

For example, the spacer is a separator, and the main material of the separator may be selected from at least one of glass fiber, non-woven fabric, polyethylene, polypropylene, and polyvinylidene fluoride.

Optionally, one or a plurality of electrode assemblies 24 may be accommodated in the shell 21. For example, in FIG. 4, the shell 21 of the battery cell 20 is provided with two electrode assemblies 24, and the two electrode assemblies 24 are stacked in the thickness direction thereof. In other words, the two electrode assemblies 24 are stacked in the thickness direction of the battery cell 20. Of course, in other embodiments, the number of the electrode assemblies 24 accommodated in the shell 21 may also be one, three, four, five, six, seven, eight, or the like.

The shell 21 may be further configured to accommodate an electrolyte, such as an electrolyte solution. The shell 21 may have various structural forms, such as a cylinder or a cuboid. Likewise, the shell 21 may also be made of various materials, such as copper, iron, aluminum, steel, or aluminum alloy.

In some embodiments, the shell 21 may include a case 213 and an end cover 214. The case 213 is provided with an accommodating cavity therein, and the accommodating cavity is configured to accommodate the electrode assembly 24, and the accommodating cavity has an opening 2131. In other words, the case 213 is of a hollow structure having the opening 2131 at one end, and the end cover 214 covers the opening 2131 of the case 213 and forms a sealed connection to form a sealed space for accommodating the electrode assembly 24 and the electrolyte.

It should be noted that the wall portion 211 for setting the pressure relief hole 212 may be the end cover 214 of the shell 21, or may be a wall of the case 213 of the shell 21. For example, in FIG. 3, the wall portion 211 is the end cover 214. Of course, the structure of the battery cell 20 is not limited thereto. In other embodiments, the wall portion 211 may also be a bottom wall of the case 213 opposite to the end cover 214, and the wall portion 211 may also be a side wall of the case 213 adjacent to and connected to the end cover 214.

When the battery cell 20 is assembled, the electrode assembly 24 may be placed in the case 213 first, the case 213 is filled with the electrolyte solution, and then the opening 2131 of the case 213 is covered with the end cover 214, so as to implement the assembling of the battery cell 20.

The case 213 may have a variety of shapes, such as a cylinder, a cuboid, or a prismatic structure. The shape of the case 213 may be determined according to the specific shape of the electrode assembly 24. For example, if the electrode assembly 24 is of a cylindrical structure, the case 213 of a cylindrical structure may be selected; and if the electrode assembly 24 is of a cuboid structure, the case 213 of a cuboid structure may be selected. Of course, the end cover 214 may have various structures. For example, the end cover 214 may be a plate-like structure or a hollow structure with one end open. For example, in FIG. 4, the case 213 is of a cuboid structure.

Of course, it is understandable that the shell 21 is not limited to the above-mentioned structure, and the shell 21 may also be of other structures. For example, the shell 21 may include a case 213 and two end covers 214, the case 213 is of a hollow structure with openings 2131 on two opposite sides, and each end cover 214 correspondingly covers each opening 2131 of the case 213 and forms a sealed connection, so as to form a sealed space for accommodating the electrode assembly 24 and the electrolyte. In other words, the case 213 is provided with openings 2131 on opposite sides, and the two end covers 214 respectively cover the two sides of the case 213 to close the corresponding openings 2131.

In some embodiments, the battery cell 20 may further include an electrode terminal 25. The electrode terminal 25 is installed on the shell 21 in an insulated manner, and the electrode terminal 25 is electrically connected to the electrode assembly 24, to input or output electric energy of the battery cell 20.

It should be noted that the electrode terminal 25 is installed on the shell 21 in an insulated manner, that is, no electrical connection is formed between the electrode terminal 25 and the shell 21.

In FIG. 3, the battery cell 20 includes two electrode terminals 25, and correspondingly, each electrode assembly 24 has two tabs 241, and the two tabs 241 have opposite polarities. The two electrode terminals 25 are electrically connected to the two tabs 241 of the electrode assembly 24, respectively, to realize the input or output of the positive and negative electrodes of the battery cell 20. It should be noted that the tab 241 of the electrode assembly 24 is a component formed by stacking and connecting regions on the positive electrode plate that are not coated with a positive electrode active material layer or a component formed by stacking and connecting regions on the negative electrode plate that are not coated with a negative electrode active material layer. If the tab 241 is used to output the positive electrode of the electrode assembly 24, the tab 241 is the component formed by stacking and connecting the regions on the positive electrode plate that are not coated with the positive electrode active material layer. If the tab 241 is used to output the negative electrode of the electrode assembly 24, the tab 241 is the component formed by stacking and connecting the regions on the negative electrode plate that are not coated with the negative electrode active material layer.

For example, the electrode terminal 25 may be made of a variety of materials. For example, the electrode terminal 25 may be made of copper, iron, aluminum, steel, aluminum alloy, or the like.

The electrode terminal 25 may be installed on the shell 21 in various structures. For example, in FIG. 3 and FIG. 4, the two electrode terminals 25 are both installed on the end cover 214 of the shell 21. Of course, the structure of the battery cell 20 is not limited to this. In other embodiments, the two electrode terminals 25 may also be installed on the case 213 of the shell 21. Similarly, for the two electrode terminals 25, one electrode terminal 25 may be installed on the case 213 of the shell 21 and the other electrode terminal 25 may be installed on the end cover 214 of the shell 21.

The reinforcement member 23 is arranged on the wall portion 211 of the shell 21, and the pressure relief component 22 and the reinforcement member 23 are both arranged in the pressure relief hole 212 of the wall portion 211. By connecting the reinforcement member 23 to the hole wall surface of the pressure relief hole 212, and arranging the reinforcement member 23 and the pressure relief component 22 in the thickness direction X of the wall portion, the reinforcement member 23 becomes a structure located on one side of the pressure relief component 22 arranged in the pressure relief hole 212 in the thickness direction X of the wall portion, so that the reinforcement member 23 is capable of improving the structural strength of a region of the wall portion 211 where the pressure relief hole 212 is arranged, and is capable of effectively alleviating the phenomenon that the pressure relief hole 212 deforms when the wall portion 211 is subjected to internal and external impact forces, thereby being capable of playing a certain protective role for the pressure relief component 22, so as to reduce the impact to the pressure relief component 22 when the wall portion 211 is subjected to the internal and external impact forces, which is conducive to alleviating the deformation of or damage to the pressure relief component 22, and is further capable of effectively reducing the situation of premature actuation for pressure relief during use of the pressure relief component 22, thereby improving the use stability and service life of the pressure relief component 22, and being conducive to improving the service life and reliability of the battery cell 20. In addition, by arranging the reinforcement member 23 in the pressure relief hole 212 and connecting the reinforcement member 23 to the hole wall surface of the pressure relief hole 212, on the one hand, the supporting effect of the reinforcement member 23 on the hole wall surface of the pressure relief hole 212 is capable of being improved, so as to enhance the protective effect of the reinforcement member 23 on the pressure relief component 22, which is conducive to further reducing the impact on the pressure relief component 22 caused by the deformation of the pressure relief hole 212 when the wall portion 211 is subjected to the internal and external impact forces. On the other hand, the space occupied by the wall portion 211 and the reinforcement member 23 in the thickness direction X of the wall portion are capable of being saved, which is conducive to improving the space utilization of the battery cell 20.

Figure 8:
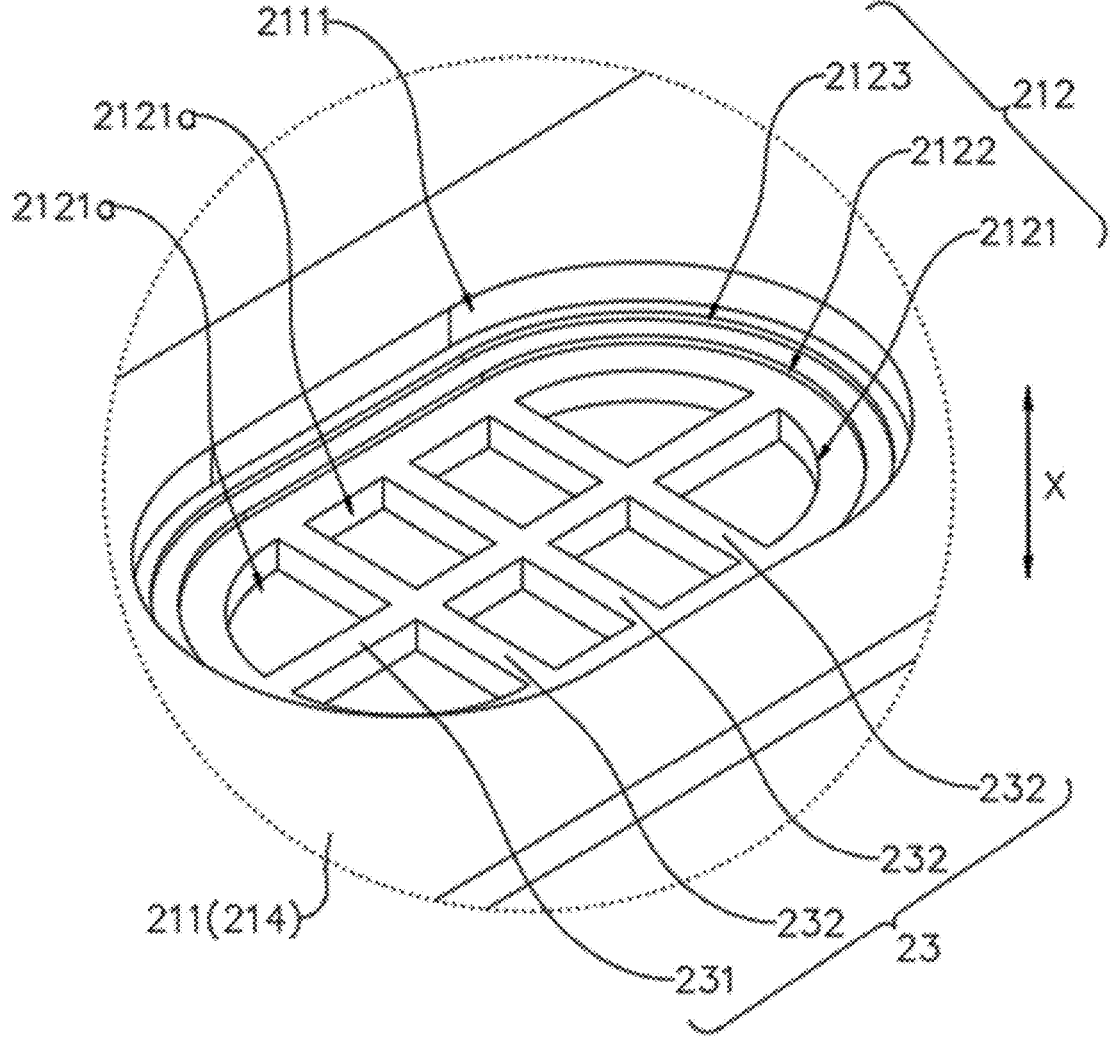
FIG. 8 is a partial enlarged diagram of a portion B of the wall portion shown in FIG. 7.

According to some embodiments of the present application, referring to FIG. 6 and FIG. 7, and further referring to FIG. 8, FIG. 8 is a partial enlarged diagram of a portion B of the wall portion 211 shown in FIG. 7. The reinforcement member 23 may include a first reinforcement portion 231, and both ends of the first reinforcement portion 231 in an extension direction thereof are connected to the hole wall surface of the pressure relief hole 212.

The first reinforcement portion 231 is of a strip-shaped structure, the extension direction of the first reinforcement portion 231 is perpendicular to the thickness direction X of the wall portion, and both ends of the first reinforcement portion 231 are connected to the hole wall surface of the pressure relief hole 212.

For example, in FIG. 6 and FIG. 8, the pressure relief hole 212 includes a first hole section 2121, the first reinforcement portion 231 is arranged in the first hole section 2121, and both ends of the first reinforcement portion 231 are connected to a hole wall surface of the first hole section 2121 to partition the first hole section 2121 into a plurality of through holes 2121a extending in the thickness direction X of the wall portion.

Optionally, there may be one or a plurality of the first reinforcement portions 231. For example, in FIG. 8, there is one first reinforcement portion 231. When there are a plurality of first reinforcement portions 231, the plurality of first reinforcement portions 231 are arranged in the pressure relief hole 212 at intervals in a direction perpendicular to the extending direction of the first reinforcement portions 231.

It should be noted that the structure of the reinforcement member 23 may be diversified. For example, the reinforcement member 23 is of a disc-shaped structure, an outer peripheral surface of the reinforcement member 23 is connected to the hole wall surface of the pressure relief hole 212, and a channel communicating the interior and the exterior of the shell 21 is formed on the reinforcement member 23.

The reinforcement member 23 is provided with the first reinforcement portion 231, and by connecting both ends of the first reinforcement portion 231 in the extension direction thereof to the hole wall surface of the pressure relief hole 212, the first reinforcement portion 231 is capable of supporting the pressure relief hole 212 in the extension direction of the first reinforcement portion 231, so that when the wall portion 211 is subjected to the internal and external impact forces, the risk of deformation of the pressure relief hole 212 in the extension direction of the first reinforcement portion 231 is capable of being reduced, thereby reducing the deformation of or damage to the pressure relief component 22 in the extension direction of the first reinforcement portion 231.

According to some embodiments of the present application, as shown in FIG. 8, the reinforcement member 23 may further include a second reinforcement portion 232, the second reinforcement portion 232 intersects with the first reinforcement portion 231, and both ends of the second reinforcement portion 232 in an extension direction thereof are connected to the hole wall surface of the pressure relief hole 212.

The second reinforcement portion 232 is also of a strip-shaped structure, the extension direction of the second reinforcement portion 232 is perpendicular to the thickness direction X of the wall portion, and both ends of the second reinforcement portion 232 are connected to the hole wall surface of the pressure relief hole 212.

For example, the second reinforcement portion 232 is arranged in the first hole section 2121, and both ends of the second reinforcement portion 232 are connected to the hole wall surface of the first hole section 2121 to partition, by cooperation of the first reinforcement portion 231 and the second reinforcement portion 232, the first hole section 2121 into a plurality of through holes 2121a extending in the thickness direction X of the wall portion.

The reinforcement member 23 is further provided with the second reinforcement portion 232 intersecting with the first reinforcement portion 231, and both ends of the second reinforcement portion 232 in the extension direction thereof are connected to the hole wall surface of the pressure relief hole 212, so that the reinforcement member 23 is capable of supporting the pressure relief hole 212 in the extension direction of the second reinforcement portion 232, which is conducive to further enhancing the protective effect of the reinforcement member 23 on the pressure relief component 22.

In some embodiments, still referring to FIG. 8, the first reinforcement portion 231 and the second reinforcement portion 232 are perpendicular to each other. In other words, the extending direction of the first reinforcement portion 231 and the extending direction of the second reinforcement portion 232 are perpendicular to each other.

The first reinforcement portion 231 and the second reinforcement portion 232 are perpendicular to each other. In other words, the extending direction of the first reinforcement portion 231 and the extending direction of the second reinforcement portion 232 are perpendicular to each other, and the extending direction of the first reinforcement portion 231 and the extending direction of the second reinforcement portion 232 are both perpendicular to the thickness direction X of the wall portion. Of course, in other embodiments, the second reinforcement portion 232 and the first reinforcement portion 231 may also be arranged at an acute angle.

By arranging the first reinforcement portion 231 and the second reinforcement portion 232 as structures perpendicular to each other, the reinforcement member 23 is capable of supporting the pressure relief hole 212 in two directions perpendicular to each other, thereby further improving the deformation resistance of the pressure relief hole 212 when subjected to the internal and external impact forces, so as to further reduce the risk of deformation of or damage to the pressure relief component 22 during use.

In some embodiments, still referring to FIG. 8, there are a plurality of second reinforcement portions 232, and the plurality of second reinforcement portions 232 are arranged at intervals in the extending direction of the first reinforcement portion 231.

For example, in FIG. 8, the reinforcement member 23 is provided with three second reinforcement portions 232, and the three second reinforcement portions 232 are arranged at intervals in the extension direction of the first reinforcement portion 231, so that the first reinforcement portion 231 and the second reinforcement portion 232 cooperate to partition the first hole section 2121 of the pressure relief hole 212 into eight through holes 2121a. Of course, in other embodiments, there may be one, two, four, five, six, or more second reinforcement portions 232.

By providing the plurality of second reinforcement portions 232 of the reinforcement member 23, and arranging the plurality of second reinforcement portions 232 at intervals in the extension direction of the first reinforcement portion 231, the structural strength of the reinforcement member 23 itself is capable of being improved, so as to further enhance the supporting effect of the reinforcement member 23 on the pressure relief hole 212, and further enhance the protective effect of the reinforcement member 23 on the pressure relief component 22.

According to some embodiments of the present application, referring to FIG. 6, FIG. 7, and FIG. 8, the pressure relief hole 212 includes the first hole section 2121, the reinforcement member 23 is arranged in the first hole section 2121, and the reinforcement member 23 is connected to the hole wall surface of the first hole section 2121. The reinforcement member 23 is configured to partition the first hole section 2121 into a plurality of through holes 2121a, and the through holes 2121a extend in the thickness direction X of the wall portion.

Optionally, the pressure relief hole 212 may be of a stepped hole structure or a structure with only one hole section. The pressure relief hole 212 includes the first hole section 2121, if the pressure relief hole 212 is of a stepped hole structure, the first hole section 2121 is one hole section among a plurality of hole sections of the pressure relief hole 212, and if the pressure relief hole 212 is a structure with only one hole section, the first hole section 2121 is the pressure relief hole 212 itself. For example, in FIG. 6 and FIG. 8, the pressure relief hole 212 is a stepped hole, and the first hole section 2121 is one hole section among the plurality of hole sections of the pressure relief hole 212.

For example, the first hole section 2121 is a hole section among the plurality of hole sections of the pressure relief hole 212 that passes through one side of the wall portion 211, that is, the first hole section 2121 is the hole section located on the outermost side in the thickness direction X of the wall portion among the plurality of hole sections of the pressure relief hole 212. If the reinforcement member 23 is located on the side of the pressure relief component 22 facing the interior of the shell 21, the first hole section 2121 passes through the side of the wall portion 211 facing the interior of the shell 21, and if the reinforcement member 23 is located on the side of the pressure relief component 22 away from the interior of the shell 21, the first hole section 2121 passes through the side of the wall portion 211 away from the interior of the shell 21. Of course, in other embodiments, the first hole section 2121 may also be a hole section located in the middle of the plurality of hole sections of the pressure relief hole 212.

Optionally, the number of hole sections of the pressure relief hole 212 of the stepped hole structure may be two, three, four, five, or the like. For example, in FIG. 6, the pressure relief hole 212 includes three hole sections, and the three hole sections are arranged in sequence in the thickness direction X of the wall portion.

The pressure relief hole 212 has the first hole section 2121, the reinforcement member 23 is arranged in the first hole section 2121 of the pressure relief hole 212, and the first hole section 2121 is partitioned into the plurality of through holes 2121a extending in the thickness direction X of the wall portion, so that the reinforcement member 23 is capable of playing a certain supporting role for the pressure relief hole 212 without affecting the normal pressure relief and exhaust of the pressure relief hole 212, so as to protect the pressure relief component 22, which is conducive to alleviating the deformation of or damage to the pressure relief component 22 during use.

According to some embodiments of the present application, referring to FIG. 4, FIG. 6, and FIG. 8, a score groove 221 is provided on the pressure relief component 22, and the pressure relief component 22 is configured to crack along the score groove 221 during pressure relief of the battery cell 20, so as to release the internal pressure of the battery cell 20. A projection of the score groove 221 in the thickness direction X of the wall portion does not overlap with the through hole 2121a.

The projection of the score groove 221 in the thickness direction X of the wall portion does not overlap with the through hole 2121a, that is, in the thickness direction X of the wall portion, the position of the score groove 221 of the pressure relief component 22 corresponds to the through hole 2121a, and the two are mutually staggered structures.

It should be noted that, in the embodiment where the pressure relief hole 212 is a stepped hole, the structure in which the projection of the score groove 221 in the thickness direction X of the wall portion does not overlap with the through hole 2121a may be of various types. For example, the projection of the score groove 221 in the thickness direction X of the wall portion may be located on the reinforcement member 23, or may be located on a step surface of the hole wall surface of the pressure relief hole 212 that connects the plurality of hole sections, so that the score groove 221 and the through hole 2121a are mutually staggered structures. In the embodiment where the pressure relief hole 212 has only one hole section, the structure in which the projection of the score groove 221 in the thickness direction X of the wall portion does not overlap with the through hole 2121a is that the projection of the score groove 221 in the thickness direction X of the wall portion is located on the reinforcement member 23.

The pressure relief component 22 is provided with the score groove 221, so that a weak region is formed on the pressure relief component 22, and therefore, the pressure relief component 22 is capable of cracking along the score groove 221 during pressure relief of the battery cell 20, thereby being capable of relieving the internal pressure of the battery cell 20. By arranging the score groove 221 of the pressure relief component 22 so that the projection in the thickness direction X of the wall portion does not overlap with the through hole 2121a, the score groove 221 of the pressure relief component 22 and the through hole 2121a are staggered with each other to alleviate the impact of an electrolyte or other external substances inside the battery cell 20 on the score groove 221 of the pressure relief component 22, thereby being capable of reducing the wear of or damage to the pressure relief component 22, reducing the situation of premature actuation for pressure relief during use of the pressure relief component 22, and being conducive to improving the service life and reliability of the battery cell 20.

According to some embodiments of the present application, referring to FIG. 4 and FIG. 6, the pressure relief component 22 is provided with the score groove 221, and the pressure relief component 22 is configured to crack along the score groove 221 during pressure relief of the battery cell 20, so as to release the internal pressure of the battery cell 20; where a sum of projection areas of the plurality of through holes 2121a in the thickness direction X of the wall portion is $S_1$, the projection area of the score groove 221 is $S_2$, and they meet $0.5S_2 \leq S_1 \leq 1.2S_2$.

The sum of the projection areas of the plurality of through holes 2121a is $S_1$, that is, the sum of the areas of orthographic projections of the plurality of through holes 2121a in a plane perpendicular to the thickness direction X of the wall portion is $S_1$. The projection area of the score groove 221 is $S_2$, that is, the area of an orthographic projection of the region of the pressure relief component 22 where the score groove 221 is provided in the plane perpendicular to the thickness direction X of the wall portion is $S_2$.

For example, the sum $S_1$ of the projection areas of the plurality of through holes 2121a may be 0.5 times, 0.55 times, 0.6 times, 0.7 times, 0.8 times, 0.9 times, 1 times, 1.1 times, 1.2 times, or the like of the projection area $S_2$ of the score groove 221.

The pressure relief component 22 is provided with the score groove 221, and by setting the sum of the projection areas of the plurality of through holes 2121a in the thickness direction X of the wall portion to 0.5 times to 1.2 times the projection area of the score groove 221 in the thickness direction X of the wall portion, on the one hand, it is capable of alleviating the phenomenon of poor exhaust and low exhaust rate due to an excessively small ratio of the sum of the projection areas of the plurality of through holes 2121a to the projection area of the score groove 221, which is conducive to improving the exhaust effect of the battery cell 20 during pressure relief. On the other hand, it is capable of alleviating the phenomenon of waste of through holes 2121a and affecting the structural strength of the reinforcement member 23 due to an excessively large ratio of the sum of the projection areas of the plurality of through holes 2121a to the projection area of the score groove 221.

According to some embodiments of the present application, referring to FIG. 6, FIG. 7, and FIG. 8, the pressure relief hole 212 includes the first hole section 2121 and a second hole section 2122 arranged in the thickness direction X of the wall portion, the projection of the first hole section 2121 in the thickness direction X of the wall portion is located in the second hole section 2122, the hole wall surface of the first hole section 2121 is connected to a hole wall surface of the second hole section 2122 through a first step surface 2124, the reinforcement member 23 is arranged in the first hole section 2121, the reinforcement member 23 is connected to the hole wall surface of the first hole section 2121, and the pressure relief component 22 covers the second hole section 2122.

The pressure relief hole 212 includes the first hole section 2121 and the second hole section 2122 arranged in the thickness direction X of the wall portion. In other words, the pressure relief hole 212 is of a stepped hole structure and includes at least two hole sections, namely the first hole section 2121 and the second hole section 2122.

For example, in FIG. 6 and FIG. 8, the pressure relief hole 212 includes three hole sections arranged in the thickness direction X of the wall portion, and the first hole section 2121 and the second hole section 2122 are arranged in sequence.

The projection of the first hole section 2121 in the thickness direction X of the wall portion is located in the second hole section 2122, that is, an aperture of the first hole section 2121 is smaller than an aperture of the second hole section 2122. In other words, the pressure relief hole 212 is of a stepped hole structure with the aperture gradually decreasing in a direction from the second hole section 2122 to the first hole section 2121 in the thickness direction X of the wall portion.

The hole wall surface of the first hole section 2121 is connected to the hole wall surface of the second hole section 2122 through the first step surface 2124, that is, the first hole section 2121 and the second hole section 2122 are structures arranged in sequence in the thickness direction X of the wall portion, so that the first hole section 2121 and the second hole section 2122 are adjacent, the first step surface 2124 is formed between the first hole section 2121 and the second hole section 2122, and the first step surface 2124 connects the hole wall surface of the first hole section 2121 and the hole wall surface of the second hole section 2122.

The pressure relief component 22 covers the second hole section 2122, that is, the second hole section 2122 is located inside the pressure relief component 22 or is the same as the projection of the pressure relief component 22 in the thickness direction X of the wall portion, so that the pressure relief component 22 is capable of blocking the second hole section 2122. Optionally, the pressure relief component 22 can be installed in various positions. When the pressure relief hole 212 only includes the first hole section 2121 and the second hole section 2122, the pressure relief component 22 is installed in the second hole section 2122 and blocks the second hole section 2122. When the number of hole sections of the pressure relief hole 212 is greater than two and the second hole section 2122 also has a hole section on one side away from the first hole section 2121 in the thickness direction X of the wall portion, the pressure relief component 22 may also be installed in the second hole section 2122, or in the hole section of the second hole section 2122 on the side away from the first hole section 2121 in the thickness direction X of the wall portion.

The pressure relief hole 212 is provided with the first hole section 2121 and the second hole section 2122 arranged in the thickness direction X of the wall portion, and the projection of the first hole section 2121 in the thickness direction X of the wall portion is located in the second hole section 2122, so that the pressure relief hole 212 has a stepped hole structure. On the one hand, it facilitates assembling of the reinforcement member 23 and the pressure relief component 22, and is conducive to reducing the difficulty of assembling the reinforcement member 23 and the pressure relief component 22. On the other hand, it is capable of optimizing a material flow pattern in the process of machining the pressure relief hole 212 on the wall portion 211, which is conducive to reducing the difficulty of machining the pressure relief hole 212.

According to some embodiments of the present application, referring to FIG. 6, the score groove 221 is provided on the pressure relief component 22, and the pressure relief component 22 is configured to crack along the score groove 221 during pressure relief of the battery cell 20, so as to release the internal pressure of the battery cell 20. The projection of the score groove 221 in the thickness direction X of the wall portion is located in the first step surface 2124.

The projection of the score groove 221 in the thickness direction X of the wall portion is located in the first step surface 2124, that is, the first step surface 2124 covers the score groove 221 arranged on the pressure relief component 22 in the thickness direction X of the wall portion.

By arranging the projection of the score groove 221 of the pressure relief component 22 to be in the first step surface 2124 between the first hole section 2121 and the second hole section 2122 in the thickness direction X of the wall portion, the score groove 221 of the pressure relief component 22 is capable of being protected to a certain extent by the first step surface 2124, so as to alleviate the impact of the electrolyte or other external substances inside the battery cell 20 on the score groove 221 of the pressure relief component 22, thereby being capable of reducing the wear of or damage to the pressure relief component 22, reducing the situation of premature actuation for pressure relief during use of the pressure relief component 22, and being conducive to improving the service life and reliability of the battery cell 20.

According to some embodiments of the present application, referring to FIG. 6, FIG. 7, and FIG. 8, the pressure relief hole 212 further includes a third hole section 2123. In the thickness direction X of the wall portion, the third hole section 2123 is located on one side of the second hole section 2122 away from the first hole section 2121, and the projection of the second hole section 2122 is located in the third hole section 2123. The hole wall surface of the second hole section 2122 is connected to a hole wall surface of the third hole section 2123 through a second step surface 2125, and the pressure relief component 22 is arranged in the third hole section 2123 and abuts against the second step surface 2125.

In the thickness direction X of the wall portion, the third hole section 2123 is located on the side of the second hole section 2122 away from the first hole section 2121, that is, in the thickness direction X of the wall portion, the first hole section 2121 and the third hole section 2123 are respectively located on both sides of the second hole section 2122.

The projection of the second hole section 2122 is located in the third hole section 2123, that is, the aperture of the second hole section 2122 is smaller than an aperture of the third hole section 2123. In other words, the pressure relief hole 212 is of a stepped hole structure with the aperture gradually decreasing in a direction from the third hole section 2123 to the first hole section 2121 in the thickness direction X of the wall portion.

The hole wall surface of the second hole section 2122 is connected to the hole wall surface of the third hole section 2123 through the second step surface 2125, that is, the second hole section 2122 and the third hole section 2123 are structures arranged in sequence in the thickness direction X of the wall portion, so that the second hole section 2122 and the third hole section 2123 are adjacent, the second step surface 2125 is formed between the second hole section 2122 and the third hole section 2123, and the second step surface 2125 connects the hole wall surface of the second hole section 2122 and the hole wall surface of the third hole section 2123.

For example, the pressure relief component 22 is connected to the hole wall surface of the third hole section 2123 so that the pressure relief component 22 is arranged in the third hole section 2123, and in the thickness direction X of the wall portion, the pressure relief component 22 abuts against the second step surface 2125 so that the pressure relief component 22 covers the second hole section 2122.

The pressure relief hole 212 is further provided with the third hole section 2123, and the first hole section 2121, the second hole section 2122, and the third hole section 2123 are structures arranged in sequence in the thickness direction X of the wall portion, so that the pressure relief hole 212 is a stepped hole structure with at least three hole sections. By arranging the pressure relief component 22 in the third hole section 2123 and abutting against the second step surface 2125, on the one hand, it is conducive to assembling the pressure relief component 22 and facilitating the pressure relief component 22 to cover the second hole section 2122; and on the other hand, the second step surface 2125 is capable of playing a certain position-limiting role on the pressure relief component 22, which is conducive to improving the structural stability of the pressure relief component 22 assembled into the pressure relief hole 212.

In some embodiments, referring to FIG. 4 and FIG. 6, the pressure relief component 22 is provided with the score groove 221, and the pressure relief component 22 is configured to crack along the score groove 221 during pressure relief of the battery cell 20, so as to release the internal pressure of the battery cell 20; where in a radio direction of the second hole section 2122, a distance between the hole wall surface of the second hole section 2122 and the score groove 221 is $L_1$, meeting $L_1 \geq 0.5$ mm.

The radial direction of the second hole section 2122 is a direction, in the plane perpendicular to the thickness direction X of the wall portion, pointing from the hole wall surface of the second hole section 2122 to the center of the second hole section 2122 or pointing from the center of the second hole section 2122 to the hole wall surface of the second hole section 2122.

For example, the score groove 221 is an annular groove structure, that is, in the plane perpendicular to the thickness direction X of the wall portion, a minimum distance between the hole wall surface of the second hole section 2122 and the score groove 221 is greater than or equal to 0.5 mm.

For example, the distance $L_1$ between the hole wall surface of the second hole section 2122 and the score groove 221 may be 0.5 mm, 0.55 mm, 0.6 mm, 0.7 mm, 0.8 mm, 1 mm, 1.2 mm, 1.3 mm, 1.5 mm, 1.8 mm, 2 mm, 2.5 mm, 3 mm, or the like.

By setting the distance between the score groove 221 of the pressure relief component 22 and the hole wall surface of the second hole section 2122 in the radial direction of the second hole section 2122 to be greater than or equal to 0.5 mm, a stress generated by the wall portion 211 acting on the region of the pressure relief component 22 where the score groove 221 is provided is capable of being reduced, thereby alleviating the damage to or rupture of the region of the pressure relief component 22 where the score groove 221 is arranged, and further reducing the risk of premature actuation for pressure relief of the pressure relief component 22, thereby improving the service life and reliability of the battery cell 20.

According to some embodiments of the present application, referring to FIG. 6, the pressure relief component 22 and the reinforcement member 23 are gap-arranged in the thickness direction X of the wall portion. That is, in the thickness direction X of the wall portion, a gap is formed between the pressure relief component 22 and the reinforcement member 23, so that the pressure relief component 22 and the reinforcement member 23 are structures arranged at an interval.

The pressure relief component 22 and the reinforcement member 23 are arranged as the gap-arranged structure in the thickness direction X of the wall portion, that is, there is the gap between the pressure relief component 22 and the reinforcement member 23 in the thickness direction X of the wall portion, so that the pressure relief component 22 and the reinforcement member 23 are arranged at an interval in the thickness direction X of the wall portion, thereby being capable of alleviating the phenomenon that the stress on the reinforcement member 23 in the process of supporting the pressure relief hole 212 affects the pressure relief component 22, so as to reduce the risk of deformation of or damage to the pressure relief component 22 due to the stress of the reinforcement member 23, and further effectively alleviate the phenomenon of premature actuation for pressure relief during use of the pressure relief component 22, which is conducive to improving the service life and reliability of the battery cell 20.

In some embodiments, still referring to FIG. 6, in the thickness direction X of the wall portion, a distance between the pressure relief component 22 and the reinforcement member 23 is $L_2$, meeting 0.3 mm≤$L_2$≤5 mm.

The distance between the pressure relief component 22 and the reinforcement member component 23 is $L_2$, that is, the dimension of the gap formed between the pressure relief component 22 and the reinforcement member component 23 in the thickness direction X of the wall portion is $L_2$.

For example, the distance $L_2$ between the pressure relief component 22 and the reinforcement member 23 may be 0.3 mm, 0.4 mm, 0.5 mm, 0.6 mm, 0.8 mm, 1 mm, 1.2 mm, 1.5 mm, 1.8 mm, 2 mm, 2.5 mm, 3 mm, 4 mm, 5 mm, or the like.

By setting the distance between the pressure relief component 22 and the reinforcement member 23 in the thickness direction X of the wall portion to 0.3 mm to 5 mm, on the one hand, it is capable of alleviating the phenomenon that the stress generated by deformation of the reinforcement member 23 is applied to the reinforcement member 23 due to the small distance between the pressure relief component 22 and the reinforcement member 23, so as to reduce the risk of deformation of or damage to the pressure relief component 22. On the other hand, it is capable of alleviating the phenomenon that the pressure relief component 22 and the reinforcement member 23 occupy too much space in the thickness direction X of the wall portion due to the large distance between the pressure relief component 22 and the reinforcement member 23, which is thereby conducive to reducing the space waste of the battery cell 20 in the thickness direction X of the wall portion, so as to improve the energy density of the battery cell 20.

According to some embodiments of the present application, referring to FIG. 6, in the thickness direction X of the wall portion, the thickness of the reinforcement member 23 is $D_1$, and the thickness of the wall portion 211 is $D_2$, meeting 0.4$D_2$≤$D_1$≤$D_2$.

The thickness of the reinforcement member 23 is $D_1$, that is, the dimension of the reinforcement member 23 in the thickness direction X of the wall portion is $D_1$.

The thickness of the wall portion 211 is $D_2$, that is, the thickness of a region of the wall portion 211 where the pressure relief hole 212 is not provided is $D_2$.

For example, the thickness $D_1$ of the reinforcement member 23 may be 0.4 times, 0.45 times, 0.5 times, 0.55 times, 0.6 times, 0.7 times, 0.8 times, 0.9 times, 1 times, or the like of the thickness $D_2$ of the wall portion 211.

By setting the thickness of the reinforcement member 23 in the thickness direction X of the wall portion to 0.4 times to 1 times the thickness of the wall portion 211, the phenomenon of insufficient structural strength of the reinforcement member 23 due to the excessively small thickness of the reinforcement member 23 is capable of being alleviated, so as to enhance the supporting effect of the reinforcement member 23 on the pressure relief hole 212, which is conducive to improving the protective effect of the reinforcement member 23 on the pressure relief component 22. On the other hand, it is capable of alleviating the phenomenon of waste and excessive space occupation caused by the excessively large thickness of the reinforcement member 23, which is conducive to reducing the manufacturing cost of the battery cell 20 and improving the energy density of the battery cell 20.

According to some embodiments of the present application, the reinforcement member 23 and the wall portion 211 are integrally formed. In other words, the reinforcement member 23 and the wall portion 211 may be manufactured by an integral molding process, such as a stamping process or a casting process.

In other embodiments, the reinforcement member 23 and the wall portion 211 may also be separate structures, and the reinforcement member 23 is connected to the wall portion 211 by welding or bonding.

For example, in FIG. 6, the reinforcement member 23 and the wall portion 211 are an integrally formed structure, the pressure relief component 22 and the wall portion 211 are separate structures, and the pressure relief component 22 is connected to the wall portion 211 by welding. Using this structure is conducive to reducing the assembling difficulty of arranging the pressure relief component 22 on the wall portion 211.

By arranging the reinforcement member 23 and the wall portion 211 as the integrally formed structure, it is conducive to improving the connection stability and structural strength between the reinforcement member 23 and the wall portion 211, so as to enhance the supporting effect of the reinforcement member 23 on the pressure relief hole 212, thereby being conducive to enhancing the protective effect of the reinforcement member 23 for the pressure relief component 22.

According to some embodiments of the present application, as shown in FIG. 6, a recessed groove 2111 is formed on one side of the wall portion 211 in the thickness direction X of the wall portion, the pressure relief hole 212 is arranged on a groove bottom wall of the recessed groove 2111, the reinforcement member 23 is arranged in the pressure relief hole 212, and the pressure relief component 22 is closer to the recessed groove 2111 than the reinforcement member 23.

The recessed groove 2111 is formed on one side of the wall portion 211, and the pressure relief hole 212 is arranged on the groove bottom wall of the recessed groove 2111, that is, the pressure relief hole 212 penetrates a groove bottom surface of the recessed groove 2111 and a surface of the wall portion 211 away from the recessed groove 2111 in the thickness direction X of the wall portion. In other words, the recessed groove 2111 and the pressure relief hole 212 are arranged in the thickness direction X of the wall portion.

The pressure relief component 22 is closer to the recessed groove 2111 than the reinforcement member 23, that is, in the thickness direction X of the wall portion, at least part of the pressure relief component 22 is located between the reinforcement member 23 and the groove bottom surface of the recessed groove 2111.

For example, in FIG. 6, the entire pressure relief component 22 is located in the pressure relief hole 212, that is, the pressure relief component 22 does not extend into the recessed groove 2111 in the thickness direction X of the wall portion, so that the recessed groove 2111 and the reinforcement member 23 are respectively located on both sides of the pressure relief component 22 in the thickness direction X of the wall portion.

The recessed groove 2111 is provided on one side of the wall portion 211 in the thickness direction thereof, and the pressure relief hole 212 is a structure that penetrates the groove bottom surface of the recessed groove 2111. By arranging the pressure relief component 22 to be closer to the recessed groove 2111 than the reinforcement member 23, the pressure relief component 22 is a structure that is at least partially located between the reinforcement member 23 and the recessed groove 2111. Therefore, the recessed groove 2111 is capable of providing a certain degree of protection for the pressure relief component 22, thereby reducing the wear of or damage to the pressure relief component 22 caused by the external environment or the internal components of the battery cell 20, and further being conducive to increasing the service life of the battery cell 20.

In some embodiments, still referring to FIG. 6, in the thickness direction X of the wall portion, a protrusion 2112 is formed on one side of the wall portion 211 away from the recessed groove 2111 and at a position corresponding to the recessed groove 2111.

For example, the recessed groove 2111 arranged on one side of the wall portion 211 is formed by a stamping process, so as to form the recessed groove 2111 on one side of the wall portion 211, and form the protrusion 2112 on the side of the wall portion 211 away from the recessed groove 2111 and at the position corresponding to the recessed groove 2111. Of course, the processing method of the recessed groove 2111 arranged on one side of the wall portion 211 is not limited thereto. In other embodiments, the recessed groove 2111 arranged on one side of the wall portion 211 may also be formed by processing techniques such as laser etching, engraving, or casting.

By forming the protrusion 2112 on the side of the wall portion 211 away from the recessed groove 2111 and at the position corresponding to the recessed groove 2111, the recessed groove 2111 of the wall portion 211 is a concave-convex structure that can be formed by stamping, thereby being capable of forming the recessed groove 2111 and the protrusion 2112 on two sides of the wall portion 211, respectively. The wall portion 211 with such a structure is easy to manufacture and is conducive to reducing the difficulty in processing the recessed groove 2111, thereby improving the processing efficiency of the recessed groove 2111.

According to some embodiments of the present application, as shown in FIG. 4, FIG. 5, and FIG. 6, in the thickness direction X of the wall portion, the pressure relief component 22 has a first side facing the interior of the shell 21, and the reinforcement member 23 is located on the first side.

The pressure relief component 22 has the first side facing the interior of the shell 21, and the reinforcement member 23 is located on the first side, that is, in the thickness direction X of the wall portion, the reinforcement member 23 is located on the side of the pressure relief component 22 facing the electrode assembly 24. In other words, in the thickness direction X of the wall portion, the reinforcement member 23 is closer to the electrode assembly 24 than the pressure relief component 22.

It should be noted that, in the embodiment in which the reinforcement member 23 is arranged in the first hole section 2121 of the pressure relief hole 212, the first hole section 2121 penetrates through one side of the wall portion 211 facing the interior of the shell 21.

It should be noted that, in the embodiment in which the recessed groove 2111 is formed on one side of the wall portion 211 and the protrusion 2112 is correspondingly formed on the other side, the pressure relief component 22 is closer to the recessed groove 2111 than the reinforcement member 23 in the thickness direction X of the wall portion. That is, the recessed groove 2111 is arranged on the side of the wall portion 211 away from the interior of the shell 21, so that the protrusion 2112 is formed on the side of the wall portion 211 facing the interior of the shell 21. Optionally, in the embodiment in which the recessed groove 2111 is arranged on the side of the wall portion 211 away from the interior of the shell 21, a protruding portion 2113 is further convexly provided on the side of the wall portion 211 away from the interior of the shell 21, and the protruding portion 2113 is arranged around the recessed groove 2111, that is, the protruding portion 2113 is an annular structure extending in a circumferential direction of the recessed groove 2111, and the protruding portion 2113 is used to install a protective patch to enhance the protection effect for the pressure relief component 22 arranged in the pressure relief hole 212.

The pressure relief component 22 has the first side facing the interior of the shell 21 in the thickness direction X of the wall portion, and the reinforcement member 23 is located on the first side of the pressure relief component 22, so that the reinforcement member 23 is closer to the interior of the shell 21 than the pressure relief component 22 in the thickness direction X of the wall portion. Therefore, the reinforcement member 23 is further capable of playing a certain partitioning role between the pressure relief component 22 and the internal components of the battery cell 20, so as to alleviate the wear of or damage to the pressure relief component 22 under the impact of the internal components of the battery cell 20.

Figure 9:
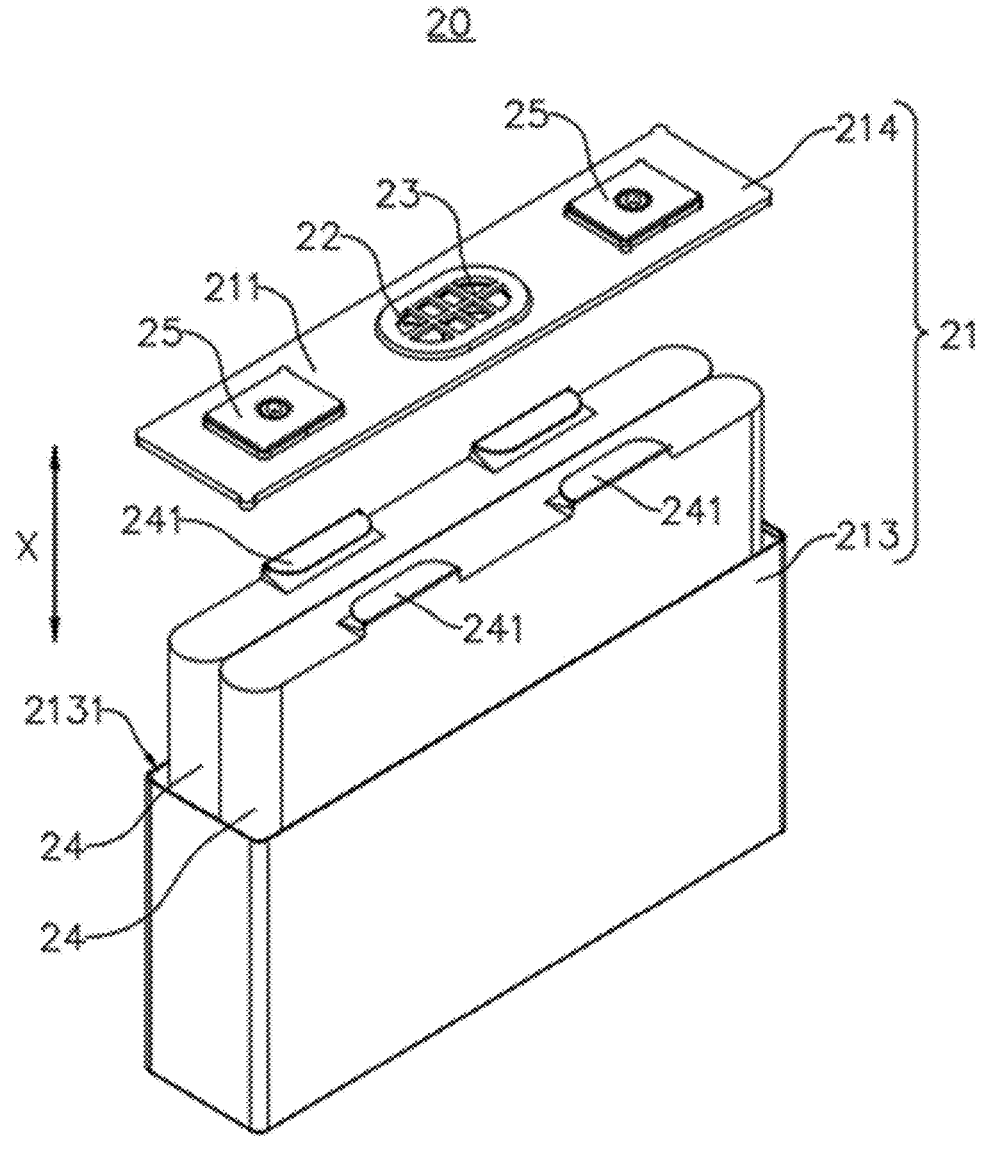
FIG. 9 is an exploded structural diagram of a battery cell according to other embodiments of the present application.
Figure 10:
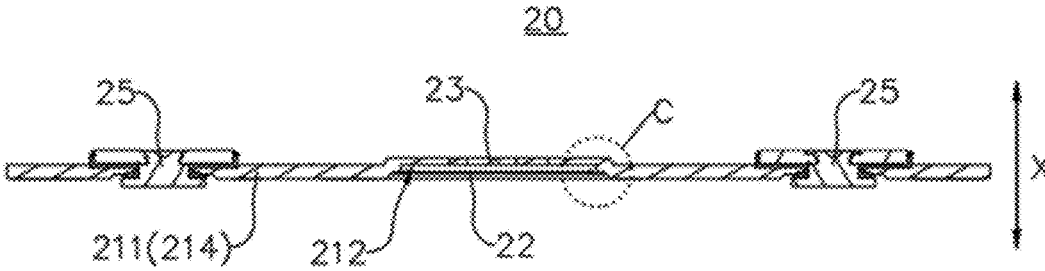
FIG. 10 is a partial sectional diagram of a battery cell according to other embodiments of the present application.
Figure 11:
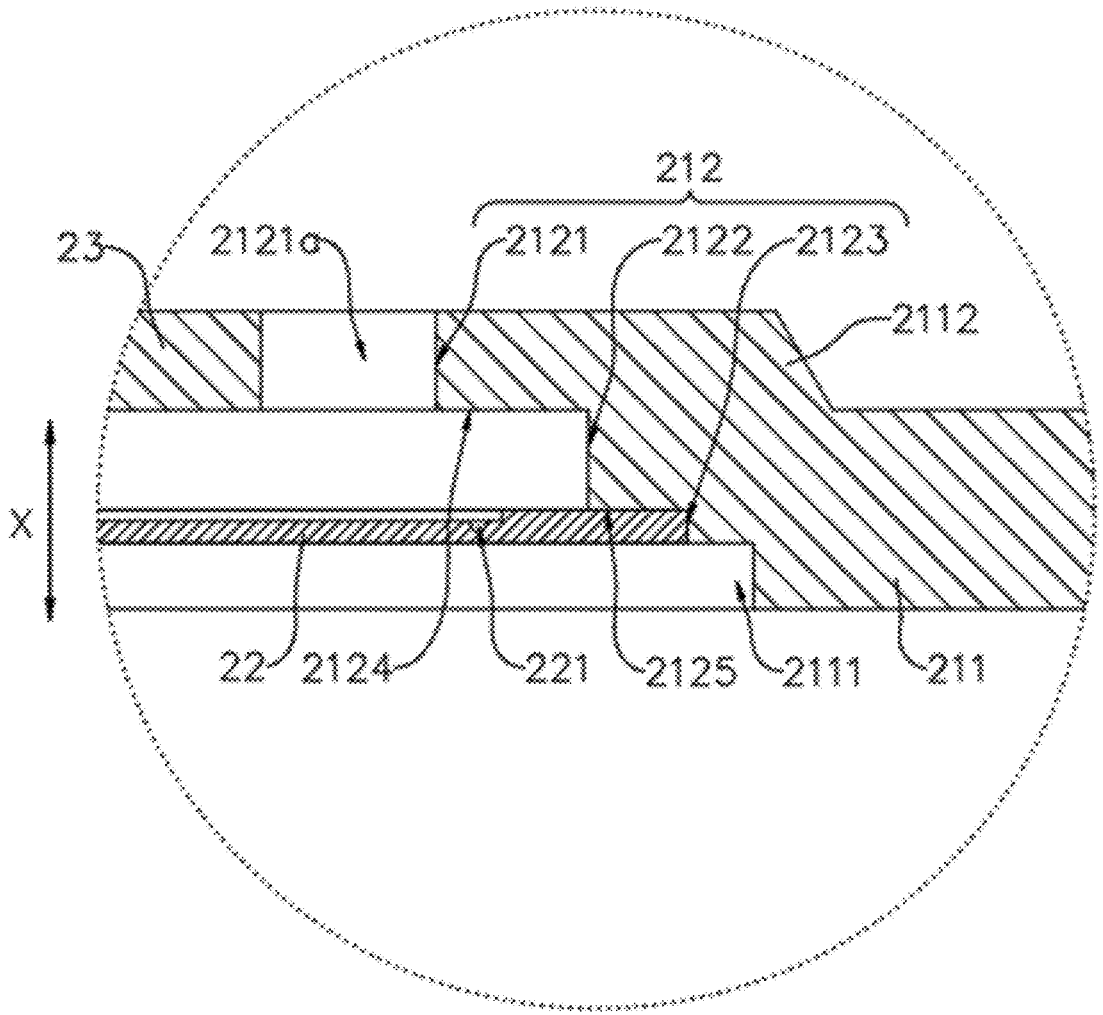
FIG. 11 is a partial enlarged diagram of a position C of the battery cell shown in FIG. 10.

Of course, the structure of the battery cell 20 is not limited thereto. In some embodiments, the battery cell 20 may further be of other structures. Referring to FIG. 9, FIG. 10, and FIG. 11, FIG. 9 is an exploded structural diagram of a battery cell 20 according to other embodiments of the present application; FIG. 10 is a partial sectional diagram of a battery cell 20 according to other embodiments of the present application; and FIG. 11 is a partial enlarged diagram of a position C of the battery cell 20 shown in FIG. 10. In the thickness direction X of the wall portion, the pressure relief component 22 has a second side away from the interior of the shell 21, and the reinforcement member 23 is located on the second side.

The pressure relief component 22 has the second side away from the interior of the shell 21, and the reinforcement member 23 is located on the second side, that is, in the thickness direction X of the wall portion, the reinforcement member 23 is located on the side of the pressure relief component 22 away from the electrode assembly 24. In other words, in the thickness direction X of the wall portion, the reinforcement member 23 is farther from the electrode assembly 24 than the pressure relief component 22.

It should be noted that, in the embodiment in which the reinforcement member 23 is arranged in the first hole section 2121 of the pressure relief hole 212, the first hole section 2121 penetrates through one side of the wall portion 211 away from the interior of the shell 21.

It should be noted that, in the embodiment in which the recessed groove 2111 is formed on one side of the wall portion 211 and the protrusion 2112 is correspondingly formed on the other side, the pressure relief component 22 is closer to the recessed groove 2111 than the reinforcement member 23 in the thickness direction X of the wall portion. That is, the recessed groove 2111 is arranged on the side of the wall portion 211 facing the interior of the shell 21, so that the protrusion 2112 is formed on the side of the wall portion 211 away from the interior of the shell 21.

The pressure relief component 22 has the second side away from the interior of the shell 21 in the thickness direction X of the wall portion, and the reinforcement member 23 is located on the second side of the pressure relief component 22, so that the reinforcement member 23 is farther from the interior of the shell 21 than the pressure relief component 22 in the thickness direction X of the wall portion. Therefore, the reinforcement member 23 is further capable of playing a certain partitioning role between the pressure relief component 22 and the external environment, so as to alleviate the wear of or damage to the pressure relief component 22 under the impact of the external environment.

According to some embodiments of the present application, referring to FIG. 3 and FIG. 4, the shell 21 includes the case 213 and the end cover 214. The case 213 is provided with an accommodating cavity having an opening 2131, and the accommodating cavity is used for accommodating the electrode assembly 24. The end cover 214 closes the opening 2131, and the end cover 214 is the wall portion 211.

The end cover 214 is the wall portion 211, that is, the pressure relief hole 212 for installing the pressure relief component 22 is arranged on the end cover 214, and the reinforcement member 23 is connected to the end cover 214.

By setting the wall portion 211 of the shell 21 as the end cover 214 of the shell 21 for closing the opening 2131 of the case 213, the battery cell 20 adopting this structure is conducive to providing the pressure relief hole 212 on the end cover 214, and it is convenient to arrange the pressure relief component 22 and the reinforcement member 23 on the end cover 214, which is capable of effectively reducing the processing difficulty of arranging the pressure relief component 22 and the reinforcement member 23 on the shell 21 of the battery cell 20, so as to improve the production efficiency of the battery cell 20.

It should be noted that the structure of the battery cell 20 is not limited thereto. In some embodiments, the battery cell 20 may be of other structures. For example, the shell 21 includes the case 213 and the end cover 214. The case 213 includes a side wall and the wall portion 211 that are integrally formed, the side wall encloses the periphery of the wall portion 211, and in the thickness direction X of the wall portion, one end of the side wall is connected to the wall portion 211, the other end encloses to form the opening 2131, and the side wall and the wall portion 211 together define the accommodating cavity for accommodating the electrode assembly 24. The end cover 214 closes the opening 2131. In other words, the wall portion 211 is the bottom wall of the case 213 arranged opposite to the end cover 214 in the thickness direction X of the wall portion, that is, the pressure relief hole 212 for installing the pressure relief component 22 is arranged on the bottom wall of the case 213, and the reinforcement member 23 is connected to the bottom wall of the case 213.

The case 213 includes the side wall and the wall portion 211 that are integrally formed, that is, the case 213 is manufactured by an integral molding process, for example, an integral molding process such as stamping, casting, or extrusion molding. In other words, the side wall and wall portion 211 of the case 213 are of an integral structure.

By arranging the wall portion 211 of the shell 21 as a wall arranged opposite to the end cover 214 of the case 213 in the thickness direction X of the wall portion, the battery cell 20 adopting this structure is capable of causing the region of the shell 21 where the pressure relief component 22 is arranged far from the end cover 214, and causing that there is no direct connection relationship between the wall portion 211 and the end cover 214, thereby being capable of alleviating the influence of the stress generated during interconnection of the end cover 214 and the case 213 on the pressure relief component 22, so as to reduce the phenomenon of cracking or reduction in structural strength of the pressure relief component 22, and further be capable of effectively reducing the situation of premature actuation of the valve for pressure relief of the battery cell 20, so as to improve the stability and service life of the battery cell 20.

According to some embodiments of the present application, an embodiment of the present application further provides a battery 100, and the battery 100 includes the battery cell 20 according to any of the above solutions.

Referring to FIG. 2, the battery 100 may further include a box 10, and the battery cell 20 is accommodated in the box 10.

In some embodiments, the box 10 includes a first box body 11 and a second box body 12. The first box body 11 and the second box body 12 cover each other, and the first box body 11 and the second box body 12 together define an assembling space for accommodating the battery cell 20.

Optionally, the second box body 12 may be of a hollow structure with one end open, the first box body 11 may be of a plate-like structure, and the first box body 11 covers the opening side of the second box body 12, so that the first box body 11 and the second box body 12 together define the assembling space. Both of the first box body 11 and the second box body 12 may also be of a hollow structure with one side open, and the opening side of the first box body 11 covers the opening side of the second box body 12.

Of course, the box 10 formed by the first box body 11 and the second box body 12 may be in a variety of shapes, such as a cylinder or a rectangular solid. For example, in FIG. 2, the box body 10 is a cuboid structure.

Optionally, there may be one or a plurality of battery cells 20 arranged in the box 10. For example, in FIG. 2, there are a plurality of battery cells 20 arranged in the box 10 of the battery 100, the plurality of battery cells 20 may be connected in series, parallel, or parallel-series connection. The parallel-series connection means that the plurality of battery cells 20 are connected in both series and parallel. The plurality of battery cells 20 may be directly connected in series, in parallel, or in parallel-series, and then the entirety formed by the plurality of battery cells 20 is accommodated in the box 10. Of course, the battery 100 may also be an entirety formed by connecting the plurality of battery cells 20 in series, in parallel, or in parallel-series to form battery modules 100 and then connecting the plurality of battery modules 100 in series, in parallel, or in parallel-series, and is then accommodated in the box 10.

The battery 100 may further include other structures. For example, the battery 100 may further include a convergence component, and the plurality of battery cells 20 can be connected through the convergence component so as to realize the electrical connection between the plurality of battery cells 20.

It should be noted that, in some embodiments, the battery 100 may not be provided with a box 10. The battery 100 includes a plurality of battery cells 20, and the battery 100 composed of the plurality of battery cells 20 may be directly assembled on an electrical apparatus to provide electrical energy to the electrical apparatus through the plurality of battery cells 20. In other words, the box 10 may be used as a part of an electrical apparatus. The electrical apparatus is, for example, a vehicle 1000, and the box 10 may be used as a part of a chassis structure of the vehicle 1000. For example, a part of the box 10 may become at least a part of a floor of the vehicle 1000, or a part of the box 10 may be at least a part of a cross beam and a longitudinal beam of the vehicle 1000.

According to some embodiments of the present application, an embodiment of the present application further provides an electrical apparatus, the electrical apparatus includes the battery cell 20 according to any of the above solutions, and the battery cell 20 is used to provide electrical energy to the electrical apparatus.

The electrical apparatus may be any above-mentioned device or system applying the battery cell 20.

According to some embodiments of the present application, referring to FIG. 3 to FIG. 8, the present application provides a battery cell 20. The battery cell 20 includes a shell 21, an electrode assembly 24, a pressure relief component 22, and a reinforcement member 23. The shell 21 has a wall portion 211, and the wall portion 211 is provided with a pressure relief hole 212. The shell 21 includes a case 213 and an end cover 214. An accommodating cavity having an opening 2131 is formed in the interior of the case, and the accommodating cavity is configured to accommodate the electrode assembly 24. The end cover 214 closes the opening 2131, and the end cover 214 is the wall portion 211. In a thickness direction X of the wall portion, a recessed groove 2111 is provided on one side of the wall portion 211 away from the interior of the shell 21, a protrusion 2112 is formed on one side of the wall portion 211 facing the interior of the shell 21 and at a position corresponding to the recessed groove 2111. The pressure relief hole 212 is provided on a groove bottom wall of the recessed groove 2111, and the pressure relief hole 212 passes through a groove bottom surface of the recessed groove 2111 and a surface of the protrusion 2112 facing the interior of the shell 21. The pressure relief hole 212 includes a first hole section 2121, a second hole section 2122, and a third hole section 2123 which are arranged in sequence in the thickness direction X of the wall portion and have apertures increasing successively. The first hole section 2121 penetrates the surface of the protrusion 2112 facing the interior of the shell 21, and the third hole section 2123 penetrates the groove bottom surface of the recessed groove 2111. A hole wall surface of the first hole section 2121 and a hole wall surface of the second hole section 2122 are connected by a first step surface 2124, and the hole wall surface of the second hole section 2122 and a hole wall surface of the third hole section 2123 are connected by a second step surface 2125. The electrode assembly 24 is arranged in the shell 21. The pressure relief component 22 is entirely arranged in the third hole section 2123, the pressure relief component 22 is welded to the hole wall surface of the third hole section 2123, the pressure relief component 22 abuts against the second step surface 2125, and the pressure relief component 22 covers the second hole section 2122. The pressure relief component 22 is provided with a score groove 221. The pressure relief component 22 is configured to crack along the score groove 221 during pressure relief of the battery cell 20, so as to release an internal pressure of the battery cell 20. A projection of the score groove 221 in the thickness direction X of the wall portion is located in the first step surface 2124. In a radial direction of the second hole section 2122, a distance between the hole wall surface of the second hole section 2122 and the score groove 221 is $L_1$, meeting $L_1 \geq 0.5$ mm. The reinforcement member 23 is entirely arranged in the first hole section 2121 so that the reinforcement member 23 and the recessed groove 2111 are respectively located on both sides of the pressure relief component 22 in the thickness direction X of the wall portion. The reinforcement member 23 is connected to the hole wall surface of the first hole section 2121, and the reinforcement member 23 and the wall portion 211 are of an integrally formed structure. The reinforcement member 23 includes a first reinforcement portion 231 and a plurality of second reinforcement portions 232. Both ends of the first reinforcement portion 231 in its extension direction are connected to the hole wall surface of the pressure relief hole 212. The second reinforcement portion 232 and the first reinforcement portion 231 are perpendicular to each other, and both ends of the second reinforcement portion 232 in its extension direction are connected to the hole wall surface of the pressure relief hole 212. The plurality of second reinforcement portions 232 are arranged at intervals in the extension direction of the first reinforcement portion 231 so that the reinforcement member 23 partitions the first hole section 2121 into a plurality of through holes 2121a, and the through holes 2121a extend in the thickness direction X of the wall portion. In the thickness direction X of the wall portion, the projection of the score groove 221 does not overlap with the through hole 2121a, a sum of projection areas of the plurality of through holes 2121a is $S_1$, and a projection area of the score groove 221 is $S_2$, meeting $0.5S_2 \leq S_1 \leq 1.2S_2$.

In the thickness direction X of the wall portion, the pressure relief component 22 and the reinforcement member 23 are gap-arranged, a distance between the pressure relief component 22 and the reinforcement member 23 is $L_2$, meeting 0.3 mm$\leq L_2 \leq$5 mm. In the thickness direction X of the wall portion, the thickness of the reinforcement member 23 is $D_1$, and the thickness of the wall portion 211 is $D_2$, meeting $0.4D_2 \leq D_1 \leq D_2$.

According to some embodiments of the present application, referring to FIG. 9 to FIG. 11, the present application provides a battery cell 20. The battery cell 20 includes a shell 21, an electrode assembly 24, a pressure relief component 22, and a reinforcement member 23. The shell 21 has a wall portion 211, and the wall portion 211 is provided with a pressure relief hole 212. The shell 21 includes a case 213 and an end cover 214. An accommodating cavity having an opening 2131 is formed in the interior of the case, and the accommodating cavity is configured to accommodate the electrode assembly 24. The end cover 214 closes the opening 2131, and the end cover 214 is the wall portion 211. In a thickness direction X of the wall portion, a recessed groove 2111 is provided on one side of the wall portion 211 facing the interior of the shell 21, a protrusion 2112 is formed on one side of the wall portion 211 away from the interior of the shell 21 and at a position corresponding to the recessed groove 2111. The pressure relief hole 212 is provided on a groove bottom wall of the recessed groove 2111, and the pressure relief hole 212 passes through a groove bottom surface of the recessed groove 2111 and a surface of the protrusion 2112 away from the interior of the shell 21. The pressure relief hole 212 includes a first hole section 2121, a second hole section 2122, and a third hole section 2123 which are arranged in sequence in the thickness direction X of the wall portion and have apertures increasing successively. The first hole section 2121 penetrates the surface of the protrusion 2112 away from the interior of the shell 21, and the third hole section 2123 penetrates the groove bottom surface of the recessed groove 2111. A hole wall surface of the first hole section 2121 and a hole wall surface of the second hole section 2122 are connected by a first step surface 2124, and the hole wall surface of the second hole section 2122 and a hole wall surface of the third hole section 2123 are connected by a second step surface 2125. The electrode assembly 24 is arranged in the shell 21. The pressure relief component 22 is entirely arranged in the third hole section 2123, the pressure relief component 22 is welded to the hole wall surface of the third hole section 2123, the pressure relief component 22 abuts against the second step surface 2125, and the pressure relief component 22 covers the second hole section 2122. The pressure relief component 22 is provided with a score groove 221. The pressure relief component 22 is configured to crack along the score groove 221 during pressure relief of the battery cell 20, so as to release an internal pressure of the battery cell 20. A projection of the score groove 221 in the thickness direction X of the wall portion is located in the first step surface 2124. In a radial direction of the second hole section 2122, a distance between the hole wall surface of the second hole section 2122 and the score groove 221 is $L_1$, meeting $L_1 \geq$0.5 mm. The reinforcement member 23 is entirely arranged in the first hole section 2121 so that the reinforcement member 23 and the recessed groove 2111 are respectively located on both sides of the pressure relief component 22 in the thickness direction X of the wall portion. The reinforcement member 23 is connected to the hole wall surface of the first hole section 2121, and the reinforcement member 23 and the wall portion 211 are of an integrally formed structure. The reinforcement member 23 includes a first reinforcement portion 231 and a plurality of second reinforcement portions 232. Both ends of the first reinforcement portion 231 in its extension direction are connected to the hole wall surface of the pressure relief hole 212. The second reinforcement portion 232 and the first reinforcement portion 231 are perpendicular to each other, and both ends of the second reinforcement portion 232 in its extension direction are connected to the hole wall surface of the pressure relief hole 212. The plurality of second reinforcement portions 232 are arranged at intervals in the extension direction of the first reinforcement portion 231 so that the reinforcement member 23 partitions the first hole section 2121 into a plurality of through holes 2121a, and the through holes 2121a extend in the thickness direction X of the wall portion. In the thickness direction X of the wall portion, the projection of the score groove 221 does not overlap with the through hole 2121a, a sum of projection areas of the plurality of through holes 2121a is $S_1$, and a projection area of the score groove 221 is $S_2$, meeting $0.5S_2 \leq S_1 \leq 1.2S_2$.

In the thickness direction X of the wall portion, the pressure relief component 22 and the reinforcement member 23 are gap-arranged, a distance between the pressure relief component 22 and the reinforcement member 23 is $L_2$, meeting 0.3 mm$\leq L_2 \leq$5 mm. In the thickness direction X of the wall portion, the thickness of the reinforcement member 23 is $D_1$, and the thickness of the wall portion 211 is $D_2$, meeting $0.4D_2 \leq D_1 \leq D_2$.

It should be noted that, without conflict, embodiments in the present application and features in the embodiments may be combined together.

The above are only preferred examples of the present application, and are not intended to limit the present application. For those skilled in the art, the present application may have various modifications and changes. Any modification, equivalent replacement, improvement, etc. made within the spirit and principle of the present application shall fall within the scope of protection of the present application.

What is claimed is:

1. A battery cell, comprising:
   a shell, having a wall portion, wherein the wall portion is provided with a pressure relief hole;
   a pressure relief component arranged in the pressure relief hole and covering the pressure relief hole, wherein the pressure relief component is configured to release an internal pressure of the battery cell; and
   a reinforcement member arranged in the pressure relief hole and not exceeding the pressure relief hole in a thickness direction of the wall portion, wherein the reinforcement member is connected to a hole wall surface of the pressure relief hole, and the reinforcement member and the pressure relief component are arranged in the thickness direction of the wall portion to reinforce a strength of the wall portion at the pressure relief hole,
   wherein the pressure relief component and the reinforcement member are gap-arranged in the thickness direction of the wall portion, wherein in the thickness direction of the wall portion, a distance between the pressure relief component and the reinforcement member is $L_2$, meeting 0.3 mm$\leq L_2 \leq$5 mm.

2. The battery cell according to claim 1, wherein the reinforcement member comprises:
   a first reinforcement portion, wherein both ends in an extension direction thereof are connected to the hole wall surface of the pressure relief hole.

3. The battery cell according to claim 2, wherein the reinforcement member further comprises:

a second reinforcement portion intersecting with the first reinforcement portion, wherein both ends of the second reinforcement portion in an extension direction thereof are connected to the hole wall surface of the pressure relief hole.

4. The battery cell according to claim 3, wherein the first reinforcement portion and the second reinforcement portion are perpendicular to each other.

5. The battery cell according to claim 3, wherein there are a plurality of second reinforcement portions, and the plurality of second reinforcement portions are arranged at intervals in the extension direction of the first reinforcement portion.

6. The battery cell according to claim 1, wherein the pressure relief hole comprises a first hole section, the reinforcement member is arranged in the first hole section, the reinforcement member is connected to a hole wall surface of the first hole section, the reinforcement member is configured to partition the first hole section into a plurality of through holes, and the through holes extend in the thickness direction of the wall portion.

7. The battery cell according to claim 6, wherein the pressure relief component is provided with a score groove, and the pressure relief component is configured to crack along the score groove during pressure relief of the battery cell, so as to release the internal pressure of the battery cell, wherein a projection of the score groove in the thickness direction of the wall portion does not overlap with the through hole.

8. The battery cell according to claim 6, wherein the pressure relief component is provided with a score groove, and the pressure relief component is configured to crack along the score groove during pressure relief of the battery cell, so as to release the internal pressure of the battery cell, wherein in the thickness direction of the wall portion, a sum of projection areas of the plurality of through holes is $S_1$, and a projection area of the score groove is $S_2$, meeting $0.5S_2 \leq S_1 \leq 1.2S_2$.

9. The battery cell according to claim 1, wherein the pressure relief hole comprises a first hole section and a second hole section arranged in the thickness direction of the wall portion, a projection of the first hole section in the thickness direction of the wall portion is located in the second hole section, and the hole wall surface of the first hole section is connected to a hole wall surface of the second hole section by a first step surface, wherein the reinforcement member is arranged in the first hole section, the reinforcement member is connected to the hole wall surface of the first hole section, and the pressure relief component covers the second hole section.

10. The battery cell according to claim 9, wherein the pressure relief component is provided with a score groove, and the pressure relief component is configured to crack along the score groove during pressure relief of the battery cell, so as to release the internal pressure of the battery cell, wherein a projection of the score groove in the thickness direction of the wall portion is located in the first step surface; and the pressure relief hole further comprises a third hole section, in the thickness direction of the wall portion, the third hole section is located on one side of the second hole section away from the first hole section, the projection of the second hole section is located in the third hole section, the hole wall surface of the second hole section is connected to a hole wall surface of the third hole section by a second step surface, and the pressure relief component is arranged in the third hole section and abuts against the second step surface, wherein the pressure relief component is provided with a score groove, and the pressure relief component is configured to crack along the score groove during pressure relief of the battery cell, so as to release the internal pressure of the battery cell, wherein in a radial direction of the second hole section, a distance between the hole wall surface of the second hole section and the score groove is $L_1$, meeting $L_1 \geq 0.5$ mm.

11. The battery cell according to claim 1, wherein in the thickness direction of the wall portion, a thickness of the reinforcement member is $D_1$, and a thickness of the wall portion is $D_2$, meeting $0.4D_2 \leq D_1 \leq D_2$.

12. The battery cell according to claim 1, wherein the reinforcement member and the wall portion are integrally formed.

13. The battery cell according to claim 1, wherein a recessed groove is formed on one side of the wall portion in the thickness direction of the wall portion, and the pressure relief hole is arranged on a groove bottom wall of the recessed groove, wherein the pressure relief component is closer to the recessed groove than the reinforcement member, wherein in the thickness direction of the wall portion, a protrusion is formed on one side of the wall portion away from the recessed groove and at a position corresponding to the recessed groove.

14. The battery cell according to claim 1, wherein in the thickness direction of the wall portion, the pressure relief component has a first side facing an interior of the shell, and the reinforcement member is located on the first side.

15. The battery cell according to claim 1, wherein in the thickness direction of the wall portion, the pressure relief component has a second side away from an interior of the shell, and the reinforcement member is located on the second side.

16. The battery cell according to claim 1, wherein the shell comprises:

a case provided with an accommodating cavity having an opening, wherein the accommodating cavity is configured to accommodate an electrode assembly; and an end cover closing the opening, wherein the end cover is the wall portion.

17. The battery cell according to claim 1, wherein the shell comprises:

a case comprising a side wall and the wall portion that are integrally formed, wherein the side wall encloses a periphery of the wall portion, and in the thickness direction of the wall portion, one end of the side wall is connected to the wall portion, the other end encloses to form an opening, and the side wall and the wall portion together define an accommodating cavity for accommodating an electrode assembly; and an end cover closing the opening.

18. A battery, comprising the battery cell according to claim 1.

19. An electrical apparatus, comprising the battery cell according to claim 1, wherein the battery cell is configured to provide electric energy.

* * * * *